United States Patent
Zhang et al.

(10) Patent No.: US 9,768,899 B2
(45) Date of Patent: Sep. 19, 2017

(54) OPTICAL ADD/DROP MULTIPLEXER BRANCHING UNIT

(71) Applicant: Huawei Marine Networks Co., Ltd., Tianjin (CN)

(72) Inventors: Likun Zhang, Beijing (CN); Wendou Zhang, Wuhan (CN); Keqiang Cui, Beijing (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 0 days.

(21) Appl. No.: 15/192,762

(22) Filed: Jun. 24, 2016

(65) Prior Publication Data
US 2016/0308639 A1    Oct. 20, 2016

Related U.S. Application Data

(63) Continuation of application No. PCT/CN2013/090446, filed on Dec. 25, 2013.

(51) Int. Cl.
*H04J 14/00* (2006.01)
*H04J 14/02* (2006.01)
(Continued)

(52) U.S. Cl.
CPC ...... *H04J 14/0204* (2013.01); *H04B 10/2504* (2013.01); *H04B 10/80* (2013.01);
(Continued)

(58) Field of Classification Search
CPC ............... H04J 14/0204; H04J 14/0212; H04J 14/0205; H04J 14/0217; H04J 14/0289;
(Continued)

(56) References Cited

U.S. PATENT DOCUMENTS

| 8,351,790 B2 | 1/2013 | Midorikawa et al. |
| 9,106,983 B2 * | 8/2015 | Ji ........................ H04Q 11/0005 |

(Continued)

FOREIGN PATENT DOCUMENTS

| CN | 1529450 A | 9/2004 |
| CN | 1815935 A | 8/2006 |

(Continued)

OTHER PUBLICATIONS

Letellier et al., "Design Robustness of Submarine Networks Using Optical Add and Drop Multiplexing," SubOptic 2010 Conference and Convention, pp. 1-5, Yokohama, Japan (May 11-14, 2010).

(Continued)

*Primary Examiner* — Juan A Torres
(74) *Attorney, Agent, or Firm* — Leydig, Voit & Mayer, Ltd.

(57) ABSTRACT

An optical add/drop multiplexer branching apparatus is provided in the embodiments of the present invention, where the optical add/drop multiplexer branching unit includes: a trunk input end, a branch input end, a trunk output end, a branch output end, an optical add/drop multiplexer, a first coupler, a first detection circuit, and a control circuit, where the optical add/drop multiplexer includes an optical switch. A detection circuit detects whether a fault occurs in a trunk, and in a case in which a fault occurs in the trunk, a working mode is switched from a first working mode to a second working mode, to implement automatic redundancy on the trunk and ensure normal communication on a branch.

10 Claims, 16 Drawing Sheets

(51) Int. Cl.
*H04B 10/25* (2013.01)
*H04B 10/80* (2013.01)
*H04Q 11/00* (2006.01)

(52) U.S. Cl.
CPC ...... *H04J 14/0205* (2013.01); *H04J 14/0212* (2013.01); *H04Q 11/0005* (2013.01); *H04J 14/0217* (2013.01); *H04J 14/0289* (2013.01); *H04Q 2011/0015* (2013.01); *H04Q 2011/0016* (2013.01)

(58) Field of Classification Search
CPC ... H04B 10/80; H04B 10/2504; H04Q 11/0005; H04Q 2011/0015; H04Q 2011/0016
USPC .......................................................... 398/45
See application file for complete search history.

(56) References Cited

U.S. PATENT DOCUMENTS

| | | | |
|---|---|---|---|
| 9,166,726 B2* | 10/2015 | Aida | H04J 14/0201 |
| 9,641,275 B2* | 5/2017 | Manna | H04J 14/0205 |
| 2003/0030793 A1 | 2/2003 | Bastue et al. | |
| 2007/0077073 A1 | 4/2007 | Shimada | |
| 2010/0008672 A1 | 1/2010 | Kovsh et al. | |
| 2010/0290786 A1 | 11/2010 | Abbott | |
| 2011/0026925 A1 | 2/2011 | Mu et al. | |
| 2011/0058806 A1 | 3/2011 | Sabet et al. | |
| 2011/0076017 A1 | 3/2011 | Midorikawa et al. | |
| 2011/0135310 A1 | 6/2011 | Kovsh et al. | |
| 2011/0200322 A1 | 8/2011 | Kovsh et al. | |
| 2011/0311216 A1 | 12/2011 | Inoue | |
| 2012/0121267 A1 | 5/2012 | Wang et al. | |
| 2012/0129747 A1 | 5/2012 | Chen et al. | |
| 2012/0177362 A1 | 7/2012 | Zhang | |
| 2013/0016964 A1 | 1/2013 | Mu et al. | |
| 2013/0223837 A1 | 8/2013 | Zhang | |
| 2014/0099098 A1* | 4/2014 | Wang | H04J 14/0201 398/7 |
| 2014/0255020 A1* | 9/2014 | Zhang | H04J 14/0201 398/3 |
| 2015/0093111 A1* | 4/2015 | Wang | H04Q 11/0005 398/48 |
| 2015/0349879 A1* | 12/2015 | Satou | H04B 10/032 398/5 |

FOREIGN PATENT DOCUMENTS

| | | |
|---|---|---|
| CN | 101141221 A | 3/2008 |
| CN | 102742199 A | 10/2012 |
| CN | 102823173 A | 12/2012 |
| EP | 1241806 A1 | 9/2002 |
| EP | 2458762 A1 | 5/2012 |
| EP | 2490353 A1 | 8/2012 |
| WO | 9706616 A1 | 2/1997 |

OTHER PUBLICATIONS

Welt, "The Case for OADM Undersea Branching Units with Bandwith Re-Use," SubOptic 2010 Conference and Convention, pp. 1-7, Yokohama, Japan (May 11-14, 2010).

\* cited by examiner

OPTICAL ADD/DROP MULTIPLEXER BRANCHING UNIT

CROSS-REFERENCE TO RELATED APPLICATIONS

This application is a continuation of International Application No. PCT/CN2013/090446, filed Dec. 25, 2013, which is hereby incorporated by reference in its entirety.

TECHNICAL FIELD

The embodiments of the present invention relates to the field of optical communications technologies, and in particular, to an optical add/drop multiplexer branching unit.

BACKGROUND

A submarine branching unit (BU) is an underwater device of a submarine optical transmission system, and a main function of the submarine branching unit is to implement fiber pair interconnection of three ports of the BU by means of a connection configuration of fibers inside the BU. The three ports of the BU are separately connected to a submarine cable and an underwater repeater, so that service transmission among multiple stations of the submarine optical transmission system is implemented. The BU is a key device for forming the complex submarine optical transmission system.

When service transmission capacities of a trunk and a branch of the submarine optical transmission system are relatively small, because of a confidentiality requirement for service transmission, it is required that service transmission between trunks cannot be wrap connected to a branch landing station. Usually, an optical add/drop multiplexer (OADM) optical module needs to be integrated inside the BU, which is referred to as an OADM BU, and service transmission between a trunk and a branch is carried by adding and dropping a wavelength (or waveband).

For a submarine cable system integrating with an OADM BU, when a cable cut fault occurs in a trunk or a branch, an actual quantity of channels for transmission in a fiber is reduced, but output power of a submarine repeater substantially remains unchanged, which leads to an increase in single-wavelength optical power. As a result, a non-linear effect of transmission in the fiber is significantly increased, and normal service transmission cannot be sustained in a submarine cable section on a non-fault side; normal service transmission cannot be sustained even in a fault rectification period. To resolve this problem, people propose various solutions, which are also referred to as an OADM BU redundancy technology. A redundancy technology has become a basic requirement for the submarine cable optical transmission system integrating with the OADM BU.

A redundancy solution provided by an OADM BU device helps reduce an economic loss of an operator that results from a cable cut fault. In a currently used OADM BU redundancy technology, a repeater is generally integrated inside an OADM BU, and a redundancy function is implemented by using power of amplified spontaneous emission (ASE) noise generated by the repeater. Integrating with a repeater usually refers to integrating with a repeater in both a pass-through direction and an add direction inside the OADM BU.

In the solution of integrating a repeater inside the OADM BU, when a cable cut fault occurs in a trunk of the submarine cable system, the OADM BU can still obtain power supply from a submarine cable power supply line, and service optical power that is lost because of trunk cable cut is compensated for by using ASE noise generated by an erbium-doped fiber amplifier (EDFA) integrated on a pass-through optical path inside the OADM BU. The ASE noise passes through an optical filter (Wavelength Blocking Filter, WBF), is combined with an add optical path service by using an optical coupler, and is transmitted in a submarine cable line, so as to ensure that a normal optical transmission service is sustained between a branch and a trunk in neither of which a fault occurs, thereby implementing branch redundancy. When a cable cut fault occurs in a branch of the submarine cable system, service optical power that is lost because of branch cable cut is compensated for by using ASE noise generated by an EDFA integrated in an Add optical path inside the OADM BU. The ASE noise passes through a band pass filter (BPF) and is combined with service light of a pass-through optical path, so as to ensure that a normal optical transmission service is sustained in a trunk in which no fault occurs, thereby implementing trunk redundancy.

The redundancy solution of the OADM BU integrating with a repeater has the following disadvantages: 1. Although the ASE noise generated by the repeater can be used to compensate for service signal optical power that is lost when a fault occurs, an optical signal-to-noise ratio of a service optical signal may be reduced when noise optical power is transmitted together with signal light, especially for a long-distance optical transmission system, cost of the optical signal-to-noise ratio (OSNR) is excessively high, and a redundancy effect is limited; 2. Compared with a common OADM BU product, an OADM BU system integrating with the repeater is high in costs and complex in optical path, and overall product reliability is reduced; 3. Structure space of the OADM BU integrating with the repeater increases, and a structural design is complex.

SUMMARY

Embodiments of the present invention provide an optical add/drop multiplexer branching unit, to implement a redundancy function without integrating an amplifier, improve a redundancy effect, and reduce structural complexity, so as to reduce costs and improve reliability.

An aspect of an embodiment of the present invention provides an optical add/drop multiplexer branching unit, including:

a trunk input end, a branch input end, a trunk output end, a branch output end, an optical add/drop multiplexer, a first coupler, a first detection circuit, and a control circuit, where the optical add/drop multiplexer includes an optical switch;

the trunk input end is connected to an input end of the first coupler, two output ends of the first coupler are respectively connected to a first input end of the optical switch and an input end of the first detection circuit, the trunk output end is connected to a first output end of the optical switch, an output end of the first detection circuit is connected to an input end of the control circuit, an output end of the control circuit is connected to a third input end of the optical switch, the branch output end is connected to a second output end of the optical switch, and the branch input end is connected to a second input end of the optical switch;

the first detection circuit determines, according to an input optical signal, whether a trunk on a trunk input end side is faulty, and sends a detection result to the control circuit; if the trunk is normal, the optical switch is in a first working mode, and if the trunk is faulty, the control circuit sends a control instruction to the optical switch, to switch the working mode of the optical switch to a second working mode;

a trunk optical signal including a pass-through service optical signal and a drop service optical signal enters the optical add/drop multiplexer branching unit from the trunk input end, and then enters the first coupler through the input end of the first coupler; and the first coupler couples a part of the optical signal, sends a coupled optical signal to the first detection circuit, and sends the other part to the first input end of the optical switch;

an add optical path optical signal including an add service optical signal and a dummy optical signal enters the optical add/drop multiplexer branching unit from the branch input end, and then enters the second input end of the optical switch, where power of the add service optical signal is the same as that of the drop service optical signal, and power of the dummy optical signal is the same as that of the pass-through service optical signal; and when the optical switch is in the first working mode, the pass-through service optical signal that enters from the first input end is sent to the first output end, the drop service optical signal is sent to the second output end, the add service optical signal that enters from the second input end is sent to the first output end, and the dummy optical signal is sent to the second output end; and when the optical switch is in the second working mode, the add service optical signal and the dummy optical signal that enter from the second input end are sent to the first output end, to interrupt the trunk optical signal that enters from the first input end.

With reference to an implementation manner of the aspect, in a first possible implementation manner, the optical add/drop multiplexer branching unit further includes: a second coupler and a second detection circuit, where an input end of the second coupler is connected to the branch input end, and two output ends of the second coupler are respectively connected to the second detection circuit and the second input end of the optical switch;

the add optical path optical signal enters the optical add/drop multiplexer branching unit from the branch input end, and then enters the second coupler through the input end of the second coupler; and the second coupler couples a part of the optical signal, sends a coupled optical signal to the second detection circuit, and sends the other part to the second input end of the optical switch;

the second detection circuit determines, according to the input optical signal, whether a branch on a branch input end side is faulty, and sends a detection result to the control circuit; and if the branch is faulty, the control circuit sends a control instruction to the optical switch, to switch the working mode of the optical switch to a third working mode; and when the optical switch is in the third working mode, the pass-through service optical signal and the drop service optical signal that enter from the first input end are sent to the first output end, to interrupt the add optical path optical signal that enters from the second input end.

With reference to the first possible implementation manner of the aspect, in a second possible implementation manner, the optical add/drop multiplexer branching unit further includes:

a control command demodulation circuit, where an output end of the control command demodulation circuit is connected to the input end of the control circuit; and an input end of the control command demodulation circuit receives a control command and then demodulates the control command, and sends a control signal to the control circuit, so that the control circuit sends a control instruction to the optical switch, to switch the working mode of the optical switch to the second working mode or the third working mode.

With reference to the aspect, or the first or second possible implementation manner of the aspect, in a third possible implementation manner, the optical add/drop multiplexer branching unit further includes:

in a working process of the optical switch that is in the second working mode, if the first detection circuit determines that a fault in the trunk on the trunk input end side is rectified, a control instruction is sent to the optical switch, to switch the working mode of the optical switch to the first working mode; and in a working process of the optical switch that is in the third working mode, if the second detection circuit determines that a fault in the branch is rectified, a control instruction is sent to the optical switch, to switch the working mode of the optical switch to the first working mode.

With reference to the aspect, or the first or second possible implementation manner of the aspect, in a fourth possible implementation manner, the first detection circuit includes a fiber integrity signal detection circuit; the trunk optical signal includes a fiber integrity identification signal; and that the first detection circuit determines, according to an input optical signal, whether a trunk on a trunk input end side is faulty includes:

the fiber integrity signal detection circuit detects a fiber integrity identification signal in the input optical signal; if there is a fiber integrity identification signal, determines that the trunk on the trunk input end side is normal; and otherwise, determines that the trunk on the trunk input end side is faulty.

With reference to the aspect, or the first or second possible implementation manner of the aspect, in a fifth possible implementation manner, the first detection circuit includes:

a first photodetector, a transimpedance amplifier, a first resistor, a second resistor, a third resistor, and an optical power detection circuit, where an output end of the first photodetector is connected to a first end of the first resistor and a first end of the third resistor, the output end of the first photodetector is connected to an input end of an operational amplifier, and another input end of the transimpedance amplifier is grounded;

a second end of the first resistor and a first end of the second resistor are connected to a power interface, a second end of the second resistor and a second end of the third resistor are connected to an input end of the optical power detection circuit, and an output end of the optical power detection circuit is connected to the control circuit; and that the first detection circuit determines, according to an input optical signal, whether a trunk on a trunk input end side is faulty, and sends a detection result to the control circuit; and if the trunk is faulty, the control circuit sends a control instruction to the optical switch, to switch the working mode of the optical switch to a second working mode includes:

an optical splitting signal coupled by the first coupler is sent to the first photodetector, so that the first photodetector generates a current; and the optical power detection circuit triggers a level signal to the control circuit when detecting that the current is abnormal, so that the control circuit sends the control instruction to the optical switch, to switch the working mode of the optical switch to the second working mode.

With reference to the fifth possible implementation manner of the aspect, in a sixth possible implementation manner, the input end of the control command demodulation circuit is connected to an output end of the transimpedance amplifier, and the output end of the transimpedance amplifier is connected to the control circuit; and that an input end of the control command demodulation circuit receives a control command and then demodulates the control command, and sends a control signal to the control circuit, so that the control circuit sends a control instruction to the optical switch, to switch the working mode of the optical switch to the second working mode or the third working mode includes:

the first photodetector generates the current by using optical power received by the first photodetector; the current passes through the transimpedance amplifier, and the transimpedance amplifier outputs an electrical signal to the control command demodulation circuit; after obtaining the control command by means of demodulation, the control command demodulation circuit sends the control command to the control circuit; and if the control command is a predefined control command, the control circuit sends the control instruction to the optical switch, to switch the working mode of the optical switch to the second working mode or the third working mode.

With reference to the aspect, or the first or second possible implementation manner of the aspect, in a seventh possible implementation manner, the optical add/drop multiplexer includes: a first optical switch, a second optical switch, a first filter, a second filter, a third filter, and a fourth filter, where the first optical switch and the second optical switch each have four interfaces;

a third interface of the first optical switch is connected to an output end of the first coupler, an input end of the fourth filter is the branch input end, an output end of the third filter is the branch output end, and a fourth interface of the first optical switch is the trunk output end;

a first interface of the first optical switch is connected to an input port of the first filter, the first filter has one input port and two output ports, the two output ports of the first filter are respectively connected to an input port of the third filter and a second interface of the second optical switch, the fourth interface of the first optical switch is connected to the trunk output end, and a second interface of the first optical switch is connected to an output end of the second filter;

the fourth filter includes one input port and two output ports, and the two output ports of the fourth filter are respectively connected to a third interface of the second optical switch and an input port of the second filter;

a first interface of the second optical switch is connected to the input port of the third filter, and a fourth interface of the second filter is connected to the input port of the second filter;

that when the optical switch is in the first working mode, the pass-through service optical signal that enters from the first input end is sent to the first output end, the drop service optical signal is sent to the second output end, the add service optical signal that enters from the second input end is sent to the first output end, and the dummy optical signal is sent to the second output end includes:

in the first working mode, the first interface and the third interface of the first optical switch are connected, and the second interface and the fourth interface are connected; a first interface and the third interface of the second optical switch are connected, and the second interface and the fourth interface are connected; the trunk optical signal enters the first optical switch from the third interface of the first optical switch, and enters the first filter through the first interface of the first optical switch; and the first filter splits the trunk optical signal into the pass-through service optical signal and the drop service optical signal, sends the pass-through service optical signal to the second interface of the second optical switch, and sends the drop service optical signal to the third filter;

the add optical path optical signal enters the fourth filter from an input port of the fourth filter, and the fourth filter splits the add optical path optical signal into the add service optical signal and the dummy optical signal, sends the add service optical signal to the input port of the second filter, and sends the dummy optical signal to the third interface of the second optical switch;

the dummy optical signal that enters from the third interface of the second optical switch is sent to the input port of the third filter through the first interface of the second optical switch, and the third filter combines the input drop service optical signal and dummy optical signal and outputs a combined signal from an output port of the third filter; and the pass-through service optical signal that enters from the second interface of the second optical switch is sent to the input port of the second filter through the fourth interface of the second optical switch; the second filter combines the input pass-through service optical signal and add service optical signal and sends a combined signal to the second interface of the first optical switch; and the combined signal is output through the fourth interface of the first optical switch; and that when the optical switch is in the second working mode, the add service optical signal and the dummy optical signal that enter from the second input end are sent to the first output end, to interrupt the trunk optical signal that enters from the first input end includes:

in the second working mode, the first interface and the third interface of the first optical switch are connected, and the second interface and the fourth interface are connected; and the third interface and the fourth interface of the second optical switch are connected;

the add optical path optical signal enters the fourth filter from an input port of the fourth filter, and the fourth filter splits the add optical path optical signal into the add service optical signal and the dummy optical signal, sends the add service optical signal to the input port of the second filter, and sends the dummy optical signal to the third interface of the second optical switch; and the dummy optical signal that enters from the third interface of the second optical switch is sent to the input port of the second filter through the fourth interface of the second optical switch, and the second filter combines the input add service optical signal and dummy optical signal and outputs a combined signal from the output port of the third filter.

With reference to the seventh possible implementation manner of the aspect, in an eighth possible implementation manner, in the third working mode, the third interface and the fourth interface of the first optical switch are connected; and the first interface and the third interface of the second optical switch are connected, and the second interface and the fourth interface are connected; and the trunk optical signal enters the first optical switch from the third interface of the first optical switch, and is output through the fourth interface.

With reference to the second possible implementation manner of the aspect, in a ninth possible implementation manner, the control circuit includes: a micro controller unit and a drive circuit, where an input end of the micro controller unit is connected to the first detection circuit, the second detection circuit, and the control command demodulation circuit, an output end is connected to the drive circuit, and the drive circuit is connected to the optical switch; and if the detection result, sent by the first detection circuit, indicating that the trunk is faulty is received, a drive instruction is output, so that the drive circuit drives the optical switch to switch to the second working mode; if the detection result, sent by the second detection circuit, indicating that the branch is faulty is received, a drive instruction is output, so that the drive circuit drives the optical switch to switch to the third working mode; and if the control signal of the control command demodulation circuit is received, a drive instruction is output, so that the drive circuit drives the optical switch to switch to the second working mode.

It can be learned from the foregoing technical solution that, the embodiments of the present invention have the following advantages: a detection circuit detects whether a fault occurs in a trunk, and in a case in which a fault occurs in the trunk, a working mode is switched from a first working mode to a second working mode, to implement automatic redundancy on the trunk and ensure normal communication on a branch. According to the foregoing solution, a redundancy function is implemented without integrating an amplifier. Manual intervention is unnecessary, and a redundancy response speed is fast, thereby improving a redundancy effect, and significantly reducing an economic loss caused by system service transmission interruption. A used optical switch component is small in size, has a low requirement on structure space, and is of low complexity in structural design. Therefore, structural complexity is reduced, so as to reduce costs and improve reliability.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
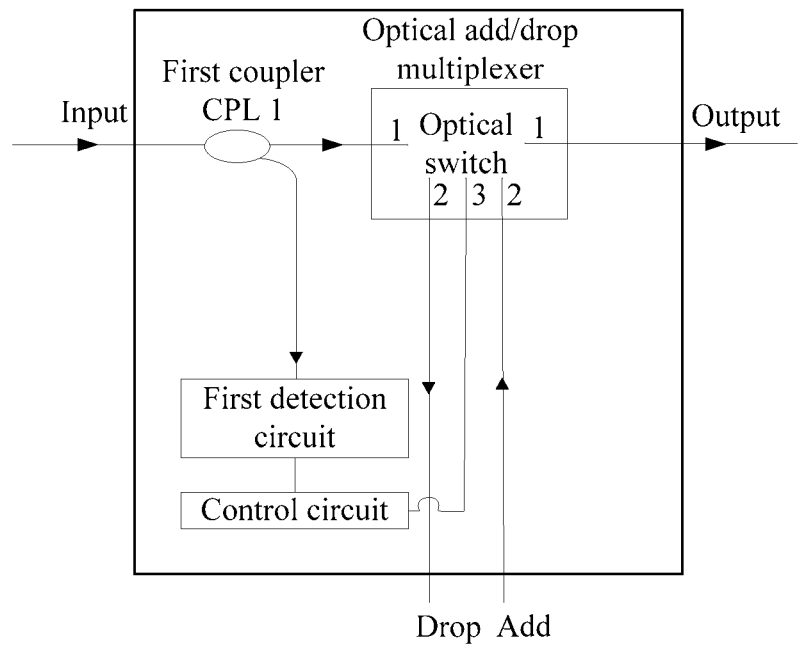
FIG. 1 is a schematic structural diagram of an optical add/drop multiplexer branching unit according to an embodiment of the present invention.

An embodiment of the present invention provides an optical add/drop multiplexer branching unit. As shown in FIG. 1, the optical add/drop multiplexer branching unit includes:

two parts, where one part is an optical path system, as shown in an upper portion of FIG. 1 (a first coupler, CPL 1, and an optical add/drop multiplexer); and the other part is a control circuit, as shown in a lower portion of FIG. 1 (a first detection circuit and a control circuit).

The optical add/drop multiplexer branching unit provided in this embodiment of the present invention specifically includes: a trunk input end (shown as an Input arrow), a branch input end (shown as an Add arrow), a trunk output end (shown as an Output arrow), a branch output end (shown as a Drop arrow), the optical add/drop multiplexer (ODAM), the first coupler (CPL 1), the first detection circuit, and the control circuit. The optical add/drop multiplexer includes an optical switch (OS). The optical switch in the optical add/drop multiplexer has three input ends and two output ends, which are separately named a first input end, a second input end, and a third input end that are identified by 1 to 3 with arrows pointing into ports in the OS in FIG. 1, and a first output end and a second output end that are identified by 1 to 2 with arrows pointing out of ports in the OS in FIG. 1.

The trunk input end is connected to an input end of the first coupler, two output ends of the first coupler are respectively connected to the first input end of the optical switch and an input end of the first detection circuit, the trunk output end is connected to the first output end of the optical switch, an output end of the first detection circuit is connected to an input end of the control circuit, an output end of the control circuit is connected to the third input end of the optical switch, the branch output end is connected to the second output end of the optical switch, and the branch input end is connected to the second input end of the optical switch.

The first detection circuit determines, according to an input optical signal, whether a trunk on a trunk input end side is faulty, and sends a detection result to the control circuit. If the trunk is normal, the optical switch is in a first working mode, and if the trunk is faulty, the control circuit sends a control instruction to the optical switch, to switch the working mode of the optical switch to a second working mode.

A trunk optical signal including a pass-through service optical signal and a drop service optical signal enters the optical add/drop multiplexer branching unit from the trunk input end, and then enters the first coupler through the input end of the first coupler. The first coupler couples a part of the optical signal, sends a coupled optical signal to the first detection circuit, and sends the other part to the first input end of the optical switch.

An add optical path optical signal including an add service optical signal and a dummy optical signal enters the optical add/drop multiplexer branching unit from the branch input end, and then enters the second input end of the optical switch. Power of the add service optical signal is the same as that of the drop service optical signal, and power of the dummy optical signal is the same as that of the pass-through service optical signal. The dummy optical signal is also referred to as a matte or filler optical signal or a fill light signal, and is an optical signal with no services modulated.

When the optical switch is in the first working mode, the pass-through service optical signal that enters from the first input end is sent to the first output end, the drop service optical signal is sent to the second output end, the add service optical signal that enters from the second input end is sent to the first output end, and the dummy optical signal is sent to the second output end. When the optical switch is in the second working mode, the add service optical signal and the dummy optical signal that enter from the second input end are sent to the first output end, to interrupt the trunk optical signal that enters from the first input end.

According to the foregoing embodiment, the working mode of the optical switch can be automatically switched to the second working mode when the trunk on the trunk input end side is faulty, so as to implement service protection. According to the foregoing embodiment, a detection circuit detects whether a fault occurs in a trunk, and in a case in which a fault occurs in the trunk, a working mode is switched from a first working mode to a second working mode, to implement automatic redundancy on the trunk and ensure normal communication on a branch. According to the foregoing solution, a redundancy function is implemented without integrating a repeater. Manual intervention is unnecessary, and a redundancy response speed is fast, thereby significantly reducing an economic loss caused by system service transmission interruption. A used optical switch component is small in size, has a low requirement on structure space, and is of low complexity in structural design. Therefore, structural complexity is reduced, so as to reduce costs and improve reliability.

Figure 2:
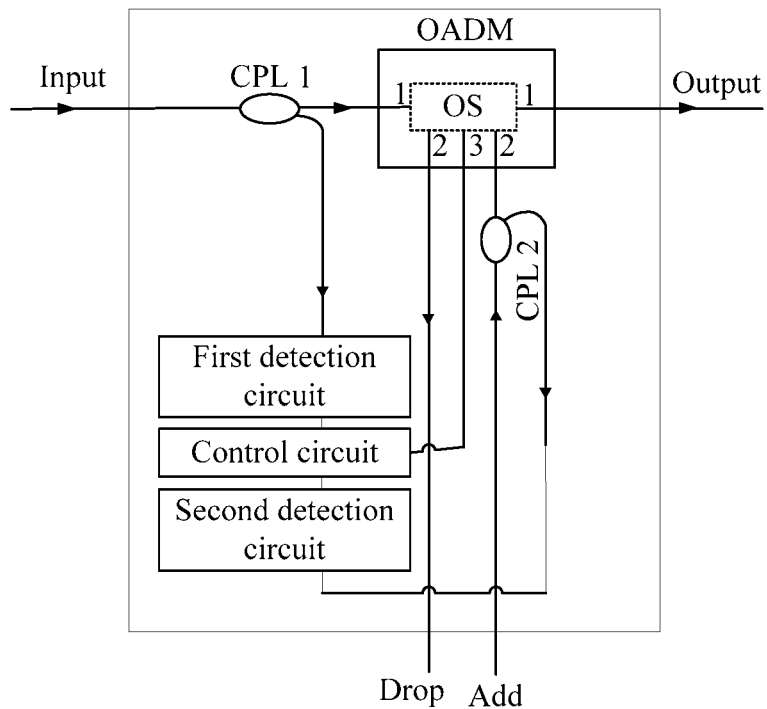
FIG. 2 is a schematic structural diagram of an optical add/drop multiplexer branching unit according to an embodiment of the present invention.

Further, an embodiment of the present invention further provides service protection when a branch is faulty, which is specifically as follows: as shown in FIG. 2, the foregoing optical add/drop multiplexer branching unit further includes: a second coupler (CPL 2) and a second detection circuit.

An input end of the second coupler is connected to the branch input end, and two output ends of the second coupler are respectively connected to the second detection circuit and the second input end of the optical switch.

The add optical path optical signal enters the optical add/drop multiplexer branching unit from the branch input end, and then enters the second coupler through the input end of the second coupler. The second coupler couples a part of the optical signal, sends a coupled optical signal to the second detection circuit, and sends the other part to the second input end of the optical switch.

The second detection circuit determines, according to the input optical signal, whether a branch on a branch input end side is faulty, and sends a detection result to the control circuit. If the branch is faulty, the control circuit sends a control instruction to the optical switch, to switch the working mode of the optical switch to a third working mode. When the optical switch is in the third working mode, the pass-through service optical signal and the drop service optical signal that enter from the first input end are sent to the first output end, to interrupt the add optical path optical signal that enters from the second input end.

Schematic descriptions of an optical path in the third working mode are made in a subsequent embodiment in a more vivid manner.

Figure 3:
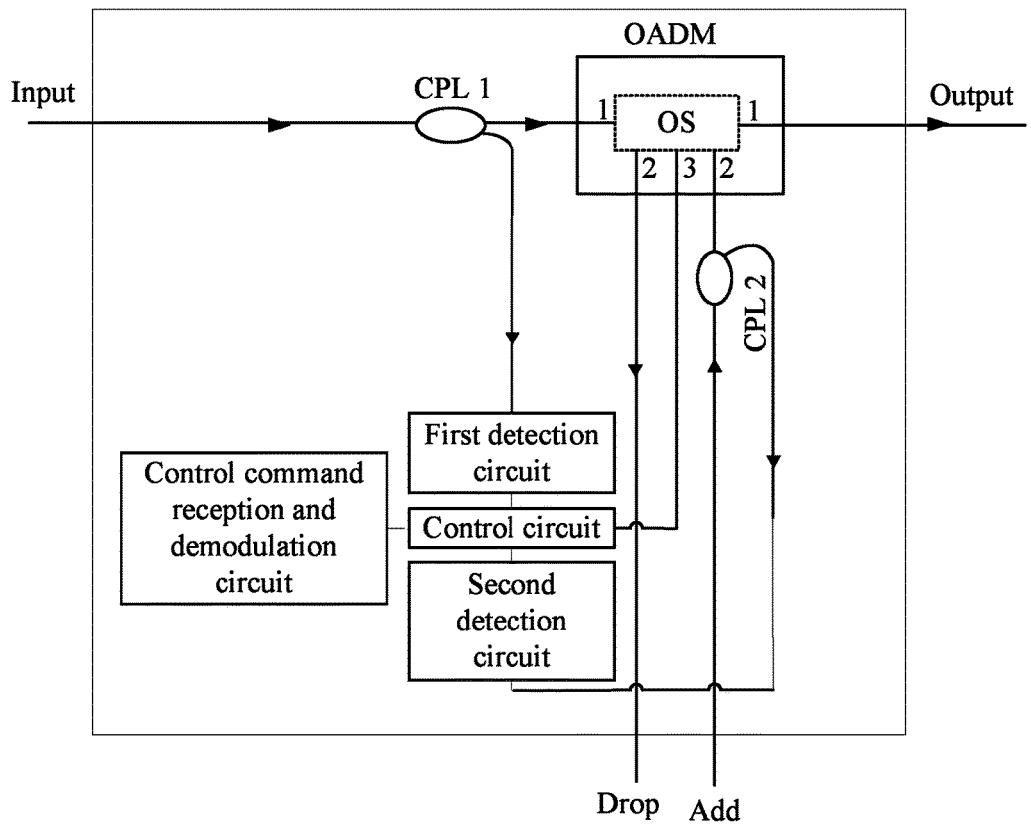
FIG. 3 is a schematic structural diagram of an optical add/drop multiplexer branching unit according to an embodiment of the present invention.

An embodiment of the present invention further provides implementation of manual protection when a trunk is faulty, and a specific application scenario is described in a subsequent embodiment in more detail, which is specifically as follows: as shown in FIG. 3, the optical add/drop multiplexer branching unit further includes a control command demodulation circuit, where an output end of the control command demodulation circuit is connected to the input end of the control circuit.

An input end of the control command demodulation circuit receives a control command and then demodulates the control command, and sends a control signal to the control circuit, so that the control circuit sends a control instruction to the optical switch, to switch the working mode of the optical switch to the second working mode or the third working mode.

Further, this embodiment of the present invention may further implement a working-mode recovery function, which is specifically as follows: in a working process of the optical switch that is in the second working mode, if the first detection circuit determines that a fault in the trunk on the trunk input end side is rectified, a control instruction is sent to the optical switch, to recover the working mode of the optical switch to the first working mode.

In a working process of the optical switch that is in the third working mode, if the second detection circuit determines that a fault in the branch is rectified, a control instruction is sent to the optical switch, to switch the working mode of the optical switch to the first working mode.

The foregoing embodiment shows a specific implementation solution of switching back to a normal mode, the first working mode, after the fault in the trunk/branch is rectified.

Figure 4:
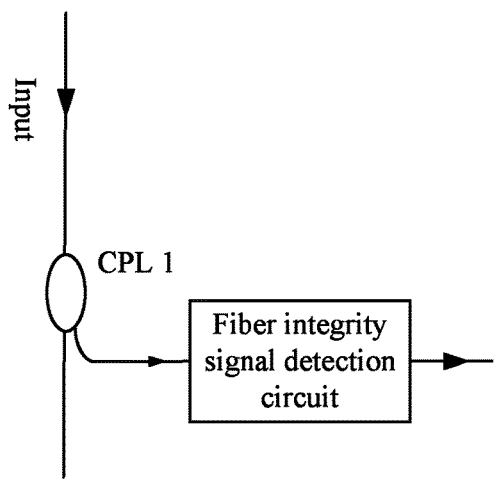
FIG. 4 is a schematic structural diagram of a first detection circuit according to an embodiment of the present invention.

An embodiment of the present invention further provides an example of a specific implementation solution of a detection circuit. Functions of the first detection circuit and the second detection circuit are the same, and both are to determine, according to a signal on an optical path, whether a fault occurs on a corresponding optical path side. Therefore, the two detection circuits may be implemented by using a same structure or by using different structures, which is not limited in this embodiment of the present invention. Examples of the two implementation solutions are provided below, which are specifically as follows:

I. As shown in FIG. 4, where further refer to FIG. 1 to FIG. 3, the first detection circuit includes a fiber integrity signal detection circuit; the trunk optical signal includes a fiber integrity identification signal; and that the first detection circuit determines, according to an input optical signal, whether a trunk on a trunk input end side is faulty includes: the fiber integrity signal detection circuit detects a fiber integrity identification signal in the input optical signal; if there is a fiber integrity identification signal, determines that the trunk on the trunk input end side is normal; and otherwise, determines that the trunk on the trunk input end side is faulty.

According to the foregoing solution, a manner of adding the fiber integrity identification signal to a trunk signal is used, and whether a fault occurs in the trunk is determined on an OADM BU side by detecting the fiber integrity identification signal. It is understandable that the fiber integrity identification signal may also be added to the add optical path optical signal of the branch. In this way, the second detection circuit may also implement fault detection on a branch fiber by using the foregoing structure.

Figure 5:
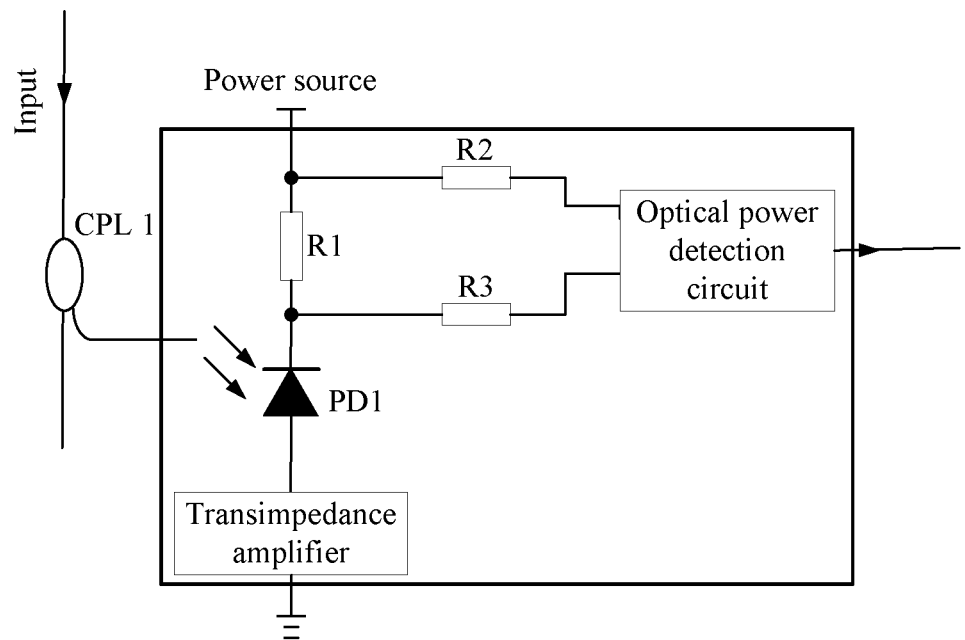
FIG. 5 is a schematic structural diagram of a first detection circuit according to an embodiment of the present invention.

II. As shown in FIG. 5, where further refer to FIG. 1 to FIG. 3, the first detection circuit (a circuit in a large solid line frame in FIG. 5) includes:

a first photodetector (PD 1), a transimpedance amplifier, a first resistor (R1), a second resistor (R2), a third resistor (R3), and an optical power detection circuit.

An output end of the first photodetector is connected to a first end of the first resistor and a first end of the third resistor, the output end of the first photodetector is connected to an input end of an operational amplifier, and another input end of the transimpedance amplifier is grounded.

A second end of the first resistor and a first end of the second resistor are connected to a power interface, a second end of the second resistor and a second end of the third resistor are connected to an input end of the optical power detection circuit, and an output end of the optical power detection circuit is connected to the control circuit.

That the first detection circuit determines, according to an input optical signal, whether a trunk on a trunk input end side is faulty, and sends a detection result to the control circuit; and if the trunk is faulty, the control circuit sends a control instruction to the optical switch, to switch the working mode of the optical switch to a second working mode includes:

an optical splitting signal coupled by the first coupler is sent to the first photodetector, so that the first photodetector generates a current; and the optical power detection circuit triggers a level signal to the control circuit when detecting that the current is abnormal, so that the control circuit sends the control instruction to the optical switch, to switch the working mode of the optical switch to the second working mode.

In the foregoing embodiment, the first detection circuit detects, in a manner of detecting input optical power, whether a fiber on an input light source side is faulty. It is understandable that the second detection circuit of the branch may also detect, by using the structure, whether a branch fiber is faulty.

Figure 6:
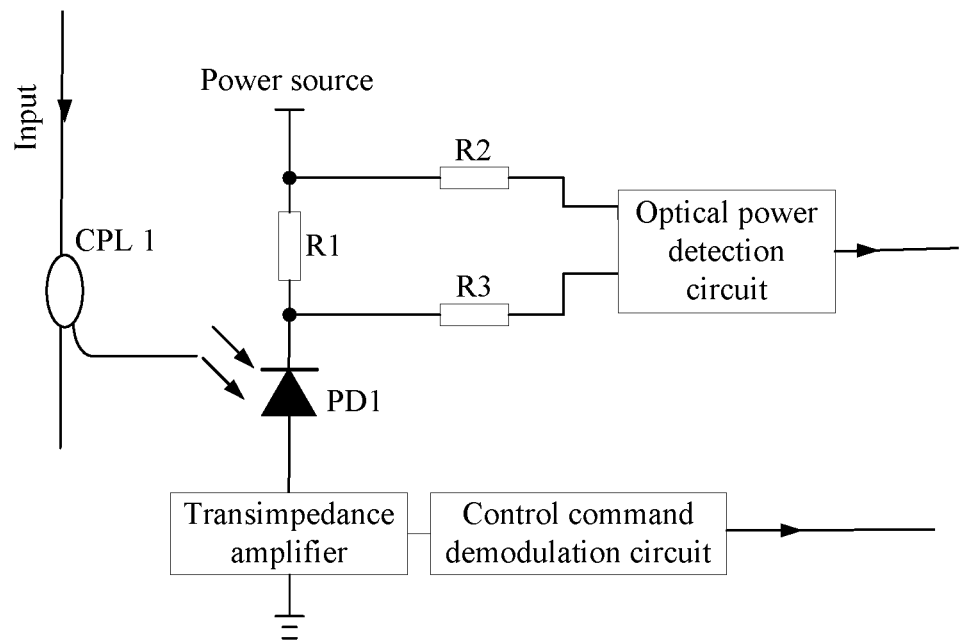
FIG. 6 is a schematic structural diagram of a control command demodulation circuit according to an embodiment of the present invention.

Based on the second implementation solution of the specific implementation solutions for the first detection circuit, an embodiment of the present invention further provides a specific structure of the control command demodulation circuit as follows: as shown in FIG. 6, where further refer to the control command demodulation circuits in FIG. 5 and FIG. 6, the input end of the control command demodulation circuit is connected to an output end of the transimpedance amplifier, and the output end of the transimpedance amplifier is connected to the control circuit.

That an input end of the control command demodulation circuit receives a control command and then demodulates the control command, and sends a control signal to the control circuit, so that the control circuit sends a control instruction to the optical switch, to switch the working mode of the optical switch to the second working mode includes:

the first photodetector generates the current by using optical power received by the first photodetector; the current passes through the transimpedance amplifier, and the transimpedance amplifier outputs an electrical signal to the control command demodulation circuit; after obtaining the control command by means of demodulation, the control command demodulation circuit sends the control command to the control circuit; and if the control command is a predefined control command, the control circuit sends the control instruction to the optical switch, to switch the working mode of the optical switch to the second working mode or the third working mode.

It can be learned from FIG. 5 and FIG. 6 that, in the foregoing embodiment, the control command demodulation circuit and the first detection circuit share the first photodetector (PD 1) and the transimpedance amplifier. In this way, hardware resource consumption may be reduced, and costs may be reduced. The control command demodulation circuit and the first detection circuit may also independently implement respective functions without sharing a component. The foregoing implementation manner of sharing a component is used as an exemplary implementation solution, and shall not be construed as a uniqueness limitation to this embodiment of the present invention.

Figure 7:
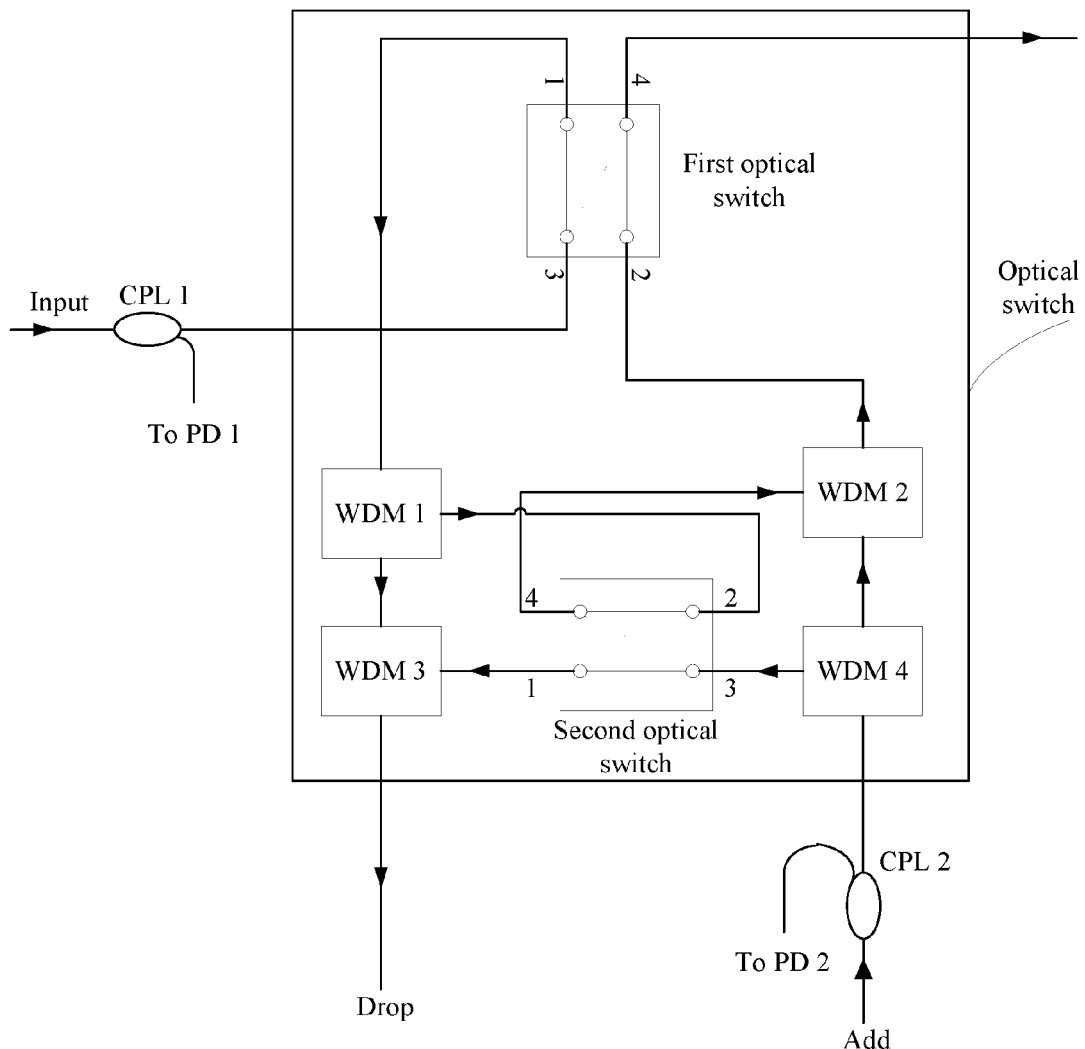
FIG. 7 is a schematic structural diagram of an optical add/drop multiplexer according to an embodiment of the present invention.

Optionally, an embodiment of the present invention further provides a specific structure of the optical add/drop multiplexer. As shown in FIG. 7, where further refer to FIG. 1 to FIG. 3, the optical add/drop multiplexer includes: a first optical switch, a second optical switch, a first filter (WDM 1), a second filter (WDM 2), a third filter (WDM 3), and a fourth filter (WDM 4), where the first optical switch and the second optical switch each have four interfaces. In the first optical switch and the second optical switch, 1 to 4 are marked on sides of the interfaces to identify an interface number of a corresponding interface. For example: 3 is marked on a lower right corner of the second optical switch, which indicates that: an interface at the lower right corner of the second optical switch is a third interface of the second optical switch. Both the first optical switch and the second optical switch have two states, where a first state is: an interface 1 is connected to an interface 3 and an interface 2 is connected to an interface 4 (shown by solid lines of the optical switch in FIG. 7), and the other state is: the interface 3 is connected to the interface 4, and in this case, the interface 1 is disconnected from the interface 3 and the interface 2 is disconnected from the interface 4 (shown by dotted lines of the optical switch in FIG. 7).

A third interface of the first optical switch is connected to an output end of the second coupler (CPL 2), an input end of the fourth filter is the branch input end (corresponding to the branch input end in FIG. 1, and corresponding to FIG. 2, the input end of the fourth filter is connected to the second coupler), an output end of the third filter is the branch output end, and a fourth interface of the first optical switch is the trunk output end.

A first interface of the first optical switch is connected to an input port of the first filter, the first filter has one input port and two output ports, the two output ports of the first filter are respectively connected to an input port of the third filter and a second interface of the second optical switch, the fourth interface of the first optical switch is connected to the trunk output end, and a second interface of the first optical switch is connected to an output end of the second filter.

The fourth filter includes one input port and two output ports, and the two output ports of the fourth filter are respectively connected to a third interface of the second optical switch and an input port of the second filter.

A first interface of the second optical switch is connected to the input port of the third filter, and a fourth interface of the second filter is connected to the input port of the second filter.

That when the optical switch is in the first working mode, the pass-through service optical signal that enters from the first input end is sent to the first output end, the drop service optical signal is sent to the second output end, the add service optical signal that enters from the second input end is sent to the first output end, and the dummy optical signal is sent to the second output end includes:

in the first working mode, the first interface and the third interface of the first optical switch are connected, and the second interface and the fourth interface are connected; a first interface and the third interface of the second optical switch are connected, and the second interface and the fourth interface are connected; the trunk optical signal enters the first optical switch from the third interface of the first optical switch, and enters the first filter through the first interface of the first optical switch; and the first filter splits the trunk optical signal into the pass-through service optical signal and the drop service optical signal, sends the pass-through service optical signal to the second interface of the second optical switch, and sends the drop service optical signal to the third filter;

the add optical path optical signal enters the fourth filter from an input port of the fourth filter, and the fourth filter splits the add optical path optical signal into the add service optical signal and the dummy optical signal, sends the add service optical signal to the input port of the second filter, and sends the dummy optical signal to the third interface of the second optical switch;

the dummy optical signal that enters from the third interface of the second optical switch is sent to the input port of the third filter through the first interface of the second optical switch, and the third filter combines the input drop service optical signal and dummy optical signal and outputs a combined signal from an output port of the third filter; and the pass-through service optical signal that enters from the second interface of the second optical switch is sent to the input port of the second filter through the fourth interface of the second optical switch; the second filter combines the input pass-through service optical signal and add service optical signal and sends a combined signal to the second interface of the first optical switch; and the combined signal is output through the fourth interface of the first optical switch.

That when the optical switch is in the second working mode, the add service optical signal and the dummy optical signal that enter from the second input end are sent to the first output end, to interrupt the trunk optical signal that enters from the first input end includes:

in the second working mode, the first interface and the third interface of the first optical switch are connected, and the second interface and the fourth interface are connected; and the third interface and the fourth interface of the second optical switch are connected;

the add optical path optical signal enters the fourth filter from an input port of the fourth filter, and the fourth filter splits the add optical path optical signal into the add service optical signal and the dummy optical signal, sends the add service optical signal to the input port of the second filter, and sends the dummy optical signal to the third interface of the second optical switch; and the dummy optical signal that enters from the third interface of the second optical switch is sent to the input port of the second filter through the fourth interface of the second optical switch, and the second filter combines the input add service optical signal and dummy optical signal and outputs a combined signal from the output port of the third filter.

Specific application scenarios in the foregoing two working modes by using the structure of the optical add/drop multiplexer are separately described in a subsequent embodiment in more detail. According to the foregoing embodiment, the working mode of the optical switch can be automatically switched to the second working mode when the trunk on the trunk input end side is faulty, so as to implement service protection.

Further, this embodiment of the present invention further provides service protection existing when a branch is faulty, as shown in FIG. 7, which is specifically as follows:

In the third working mode, the third interface and the fourth interface of the first optical switch are connected; and the first interface and the third interface of the second optical switch are connected, and the second interface and the fourth interface are connected; and the trunk optical signal enters the first optical switch from the third interface of the first optical switch, and is output through the fourth interface.

Schematic descriptions of an optical path in the third working mode are made in a subsequent embodiment in a more vivid manner.

Figure 8:
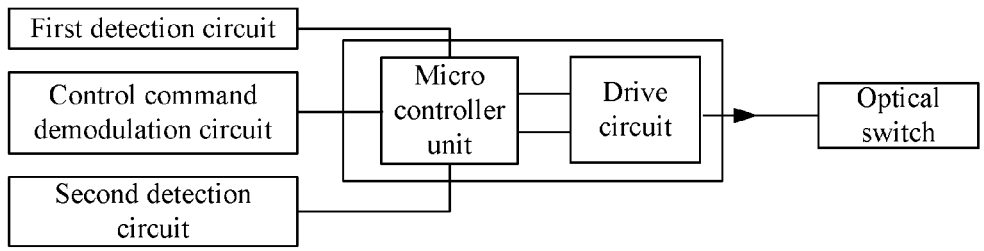
FIG. 8 is a schematic structural diagram of a control circuit according to an embodiment of the present invention.

An embodiment of the present invention further provides a specific implementation solution of a control circuit. As shown in FIG. 8, a part in a large solid line frame is the control circuit. Further refer to FIG. 3, and the control circuit includes: a micro controller unit and a drive circuit.

An input end of the micro controller unit is connected to the first detection circuit, the second detection circuit, and the control command demodulation circuit, an output end is connected to the drive circuit, and the drive circuit is connected to the optical switch.

If the detection result, sent by the first detection circuit, indicating that the trunk is faulty is received, a drive instruction is output, so that the drive circuit drives the optical switch to switch to the second working mode; if the detection result, sent by the second detection circuit, indicating that the branch is faulty is received, a drive instruction is output, so that the drive circuit drives the optical switch to switch to the third working mode; and if the control signal of the control command demodulation circuit is received, a drive instruction is output, so that the drive circuit drives the optical switch to switch to the second working mode.

According to the solution in this embodiment of the present invention, a micro controller unit (MCU), a detection circuit integrated with input optical power of the OADM, and a command reception and demodulation circuit that is remotely controlled are integrated inside an OADM BU, so that OADM BU automatic redundancy can be implemented. A manual redundancy mode can also be configured; redundancy timeliness is good, and application flexibility is strong. In addition, in the OADM automatic redundancy mode, manual intervention is unnecessary, and a redundancy response speed is fast, thereby significantly reducing an economic loss caused by system service transmission interruption. In the manual redundancy mode, in a fault rectification period for a faulty submarine cable, it can be fully ensured that normal transmission is sustained for a service in a submarine cable section in which no fault occurs, thereby avoiding service transmission interruption caused by fault rectification. The OADM solution disclosed in this embodiment of the present invention may be implemented by applying a latched 2×2 bypass optical switch and a WDM optical component. Compared with the redundancy solution in the background, in the redundancy solution provided in this embodiment of the present invention, costs are low, an optical switch component is small in size, has a low requirement on structure space, and is of low complexity in structural design, and product reliability is high.

Figure 9:
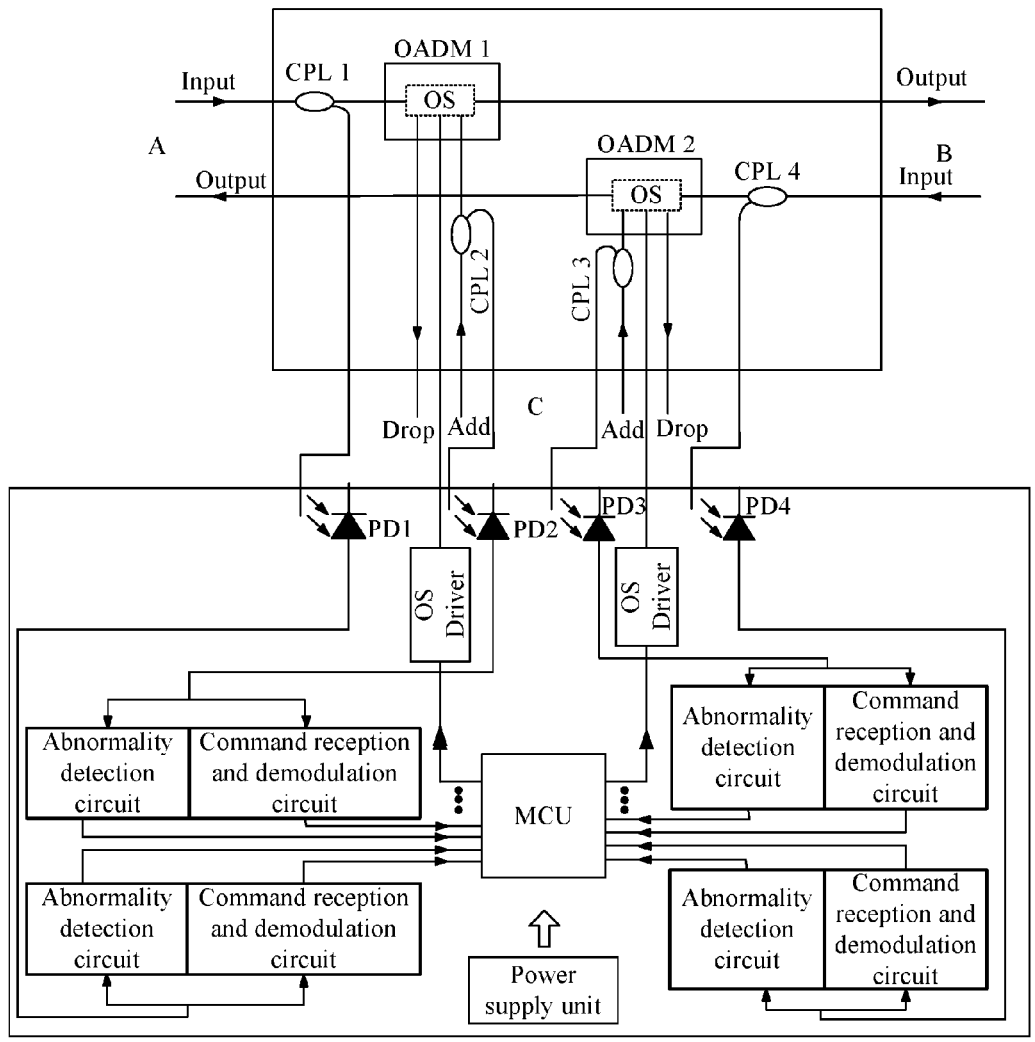
FIG. 9 is a schematic structural diagram of an optical add/drop multiplexer branching unit according to an embodiment of the present invention.

A block diagram of an overall solution in this embodiment of the present invention is shown in FIG. 9, and two parts, an optical path system (inside a large solid line frame in an upper portion of FIG. 9) and a control circuit (inside a large solid line frame in a lower portion of FIG. 9), are included, where both of the two parts are integrated inside an optical add/drop multiplexer branching unit (OADM BU).

The optical path system includes: an optical add/drop multiplexer (OADM) optical module integrating a controllable optical switch (OS), and a branching unit (coupler, CPL) that couples a part of an optical signal on which a control command is modulated; for a single-wavelength modulation solution involving only command control, an optical filter of a specific wavelength may also be included in the optical path. For importance properties of the OADM module including the optical switch, in addition to implementing functions of optical wavelength pass-through and adding or dropping, functions of Input-Output optical path pass-through and Add (add optical path)-Output optical path pass-through may further be implemented by configuring a working state of the optical switch. More detailed descriptions on the functions are made in a subsequent embodiment.

A main difference between FIG. 9 and FIG. 3 is: FIG. 3 shows a single side, and FIG. 9 shows both sides, where optical paths on the two sides are mutually mirrored. In descriptions of the subsequent embodiments, only the single side is described, and details of the other side are not described again. In FIG. 9, A and B are on a trunk device side, and C is on a branch device side. A direction shown by an arrow in the optical path system in FIG. 9 is a propagation direction of light on the optical path. An arrow direction in the control circuit in FIG. 9 is a direction of signal flow.

The control circuit includes: an abnormality detection circuit (Input Optical Power Detector) configured to detect optical power input to the OADM BU, a command reception and demodulation circuit that is remotely controlled, a minimum system of micro controller unit (Command Receiver and Demodulator, MCU), and an optical switch drive circuit, where a submarine cable system supplies power to the circuit. The abnormality detection circuit is configured to automatically detect whether an optical cable is faulty, to implement automatic switching of a working mode. The command reception and demodulation circuit is configured to detect whether there is a control signal, to implement manual switching of the working mode.

A control circuit side further includes: a micro controller unit (MCU), an optical switch drive circuit (OS Driver), and a power supply unit that supplies power to all electrical circuits (Power Supply to All Electrical Circuit). Specific functions of each part are described in a subsequent embodiment in more detail.

The branching units shown in FIG. 9 are a CPL 1 to a CPL 4, where the CPL 1 and the CPL 2 correspond to those in FIG. 3. The OADM in FIG. 3 corresponds to an OADM 1 in FIG. 9, and the CPL 1 and the CPL 2 in FIG. 3 correspond to the CPL 1 and the CPL 2 in FIG. 9. Refer to a structure in a single-side solution in FIG. 3, a structure of a corresponding side added in FIG. 9 is in a same mirror image relationship with the structure in FIG. 3, and details are not described herein again.

In the following embodiment, the three working modes of the OADM are described below in more detail:

I. First Working Mode

In normal operation, that is, in a case in which all optical cables are normal, operation is performed in the first working mode.

Figure 10:
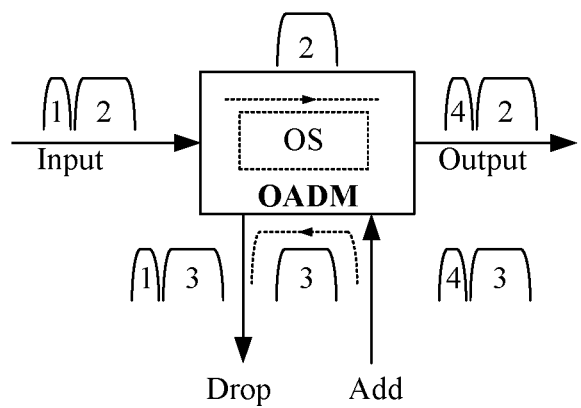
FIG. 10 is a schematic structural diagram of an OADM optical path configuration according to an embodiment of the present invention.

In the first working mode, an OADM optical path configuration is shown in FIG. 10, and further refer to FIG. 3. 1 and 2 in FIG. 10 are input optical signals, that is, trunk optical signals, where 1 carries a drop service and may be referred to as a drop service optical signal, and 2 carries a pass-through service and may be referred to as a pass-through service optical signal; 3 and 4 in FIG. 10 are add optical path optical signals, where 4 carries an add service and may be referred to as an add service optical signal, and 3 is used as a dummy optical signal and does not carry a service, and may be referred to as a dummy optical signal. In the first working mode, the dummy optical signal 3 is looped back to a Drop optical path through an OADM optical path, and is coupled with the drop service optical signal 1 to form a transmitted drop optical signal. The dummy optical signal mainly plays a role of power equilibrium. The Add optical signal 4 is coupled with the pass-through optical signal 2 to form a transmitted trunk optical signal, so as to implement service transmission between a branch and a trunk. From a perspective of power, power of the add service optical signal is the same as that of the drop service optical signal, and power of the dummy optical signal is the same as that of the pass-through service optical signal. That is, 4 and 1 are the same in power, and 2 and 3 are the same in power.

II. Second Working Mode

When a shunt fault occurs in a trunk, input optical power at an Input port of an OADM module is lost, and operation is performed in the second working mode.

Figure 11:
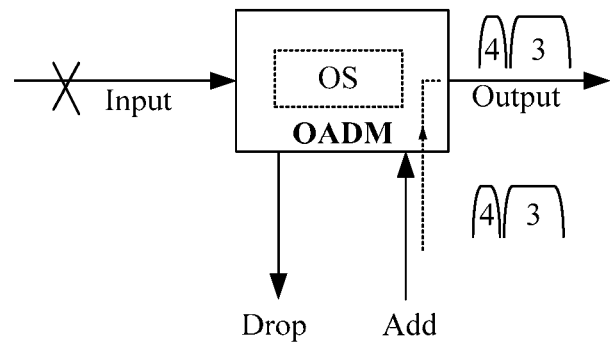
FIG. 11 is a schematic structural diagram of an OADM optical path configuration according to an embodiment of the present invention.

In the second working mode, an OADM optical path configuration is shown in FIG. 11, and further refer to FIG. 3 and FIG. 10. An Add-Output optical path is in a pass-through state, the add optical signal 4 and the dummy optical signal 3 form a complete optical signal for transmission in an optical path, and the dummy optical signal 3 replaces the pass-through service optical signal 2 that is lost because of a fault, and plays a role of power equilibrium, so as to ensure that a service carried on an Add optical path at a branch end station can be normally transmitted in a trunk of an optical cable system, thereby implementing trunk fault redundancy.

III. Third Working Mode.

When a shunt fault occurs in a branch, input optical power at an Add port of the OADM module is lost, operation is performed in the third working mode.

Figure 12:
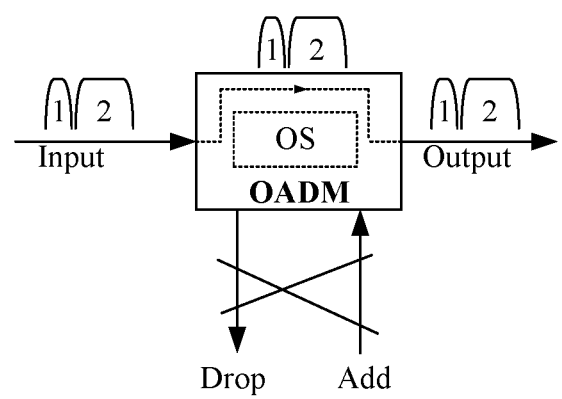
FIG. 12 is a schematic structural diagram of an OADM optical path configuration according to an embodiment of the present invention.

In the third working mode, the OADM optical path is configured to be in an Input-Output optical path pass-through state shown in FIG. 12, where the drop lightwave signal 1 and the pass-through lightwave signal 2 form a complete optical signal for transmission in an optical cable, to implement branch fault redundancy. Usually, in order not to transmit the drop service signal to a trunk end station, scrambling may be performed on the drop signal on a landing station terminal (SLTE) device at a transmit end, so as to achieve an objective of confidentiality for a transmission service.

Specific implementation and an application scenario of this embodiment of the present invention are described below in more detail.

Figure 13:
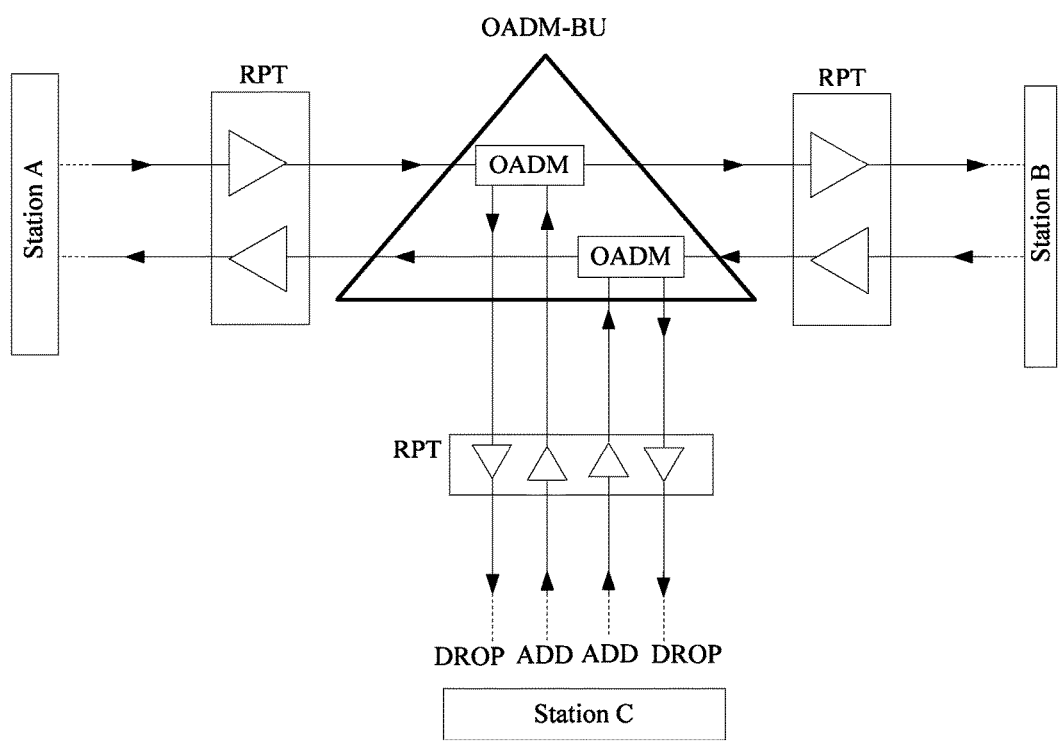
FIG. 13 is a schematic structural diagram of a submarine cable optical transmission system model according to an embodiment of the present invention.

An application environment of this embodiment of the present invention is described as follows: as shown in FIG. 13, a submarine cable optical transmission system model integrating an OADM BU is shown by using a fiber pair as an example, where service transfer between stations is implemented by using a dense wavelength division multiplexing (DWDM) optical transmission technology. The application environment of a structure shown in FIG. 3 may be determined by comparing FIG. 13 with FIG. 3.

In FIG. 13, Stations A, B, and C are three different landing stations, where the Stations A and B are trunk end stations and have a large transmission service volume, and the Station C is a branch end station, has a relatively small transmission service volume with the trunk end stations A and B, and performs service transfer with the end stations A and B by adding and dropping a wavelength (waveband) of an OADM BU device. An RPT (Repeater) in the figure is a repeater on a submarine line. Add and Drop of the branch end station C respectively represent an add optical path and a drop optical path. All arrow directions in FIG. 13 are propagation directions of an optical signal.

An SLTE (submarine line terminal) device that carries a service, power feeding equipment (PFE) for an underwater device of a submarine cable system, a submarine line monitor (submarine line monitor, SLM) device for line monitor, and a network management device of a submarine network management system (SNMS) for operating and maintaining the entire submarine cable system are configured in the landing stations A, B, and C.

Figure 14:
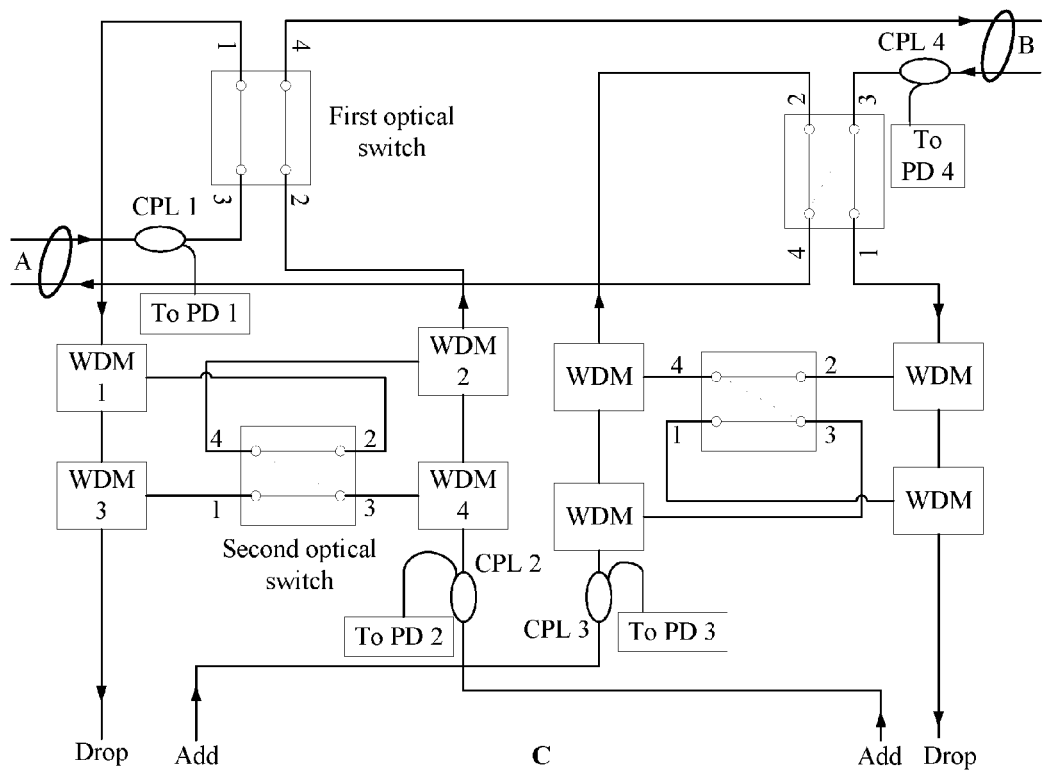
FIG. 14 is a schematic diagram of an internal structure of an OADM BU according to an embodiment of the present invention.

An optical path in this embodiment of the present invention is described below: the optical path in the present invention is shown in FIG. 14, A, B, and C in the figure represent three ports of the OADM BU, and are respectively connected to three end stations A, B, and C of a submarine cable system. Further refer to FIG. 7, FIG. 9, and FIG. 13. In FIG. 14, four latched 2×2 bypass optical switches are integrated into an OADM BU optical path, and the four optical switches have only two working states, In a first state, a port 1 is connected to a port 3, and a port 2 is connected to a port 4; in a second state, the port 3 is connected to the port 4 (where the port 1 is disconnected from the port 3, and the port 2 is disconnected from the port 4). When working normally, the latched optical switch is latched in one of the working states, and changes the working state only after being effectively driven, and the original working state is maintained in any other conditions. In FIG. 14, a WDM optical component with three ports implements adding and dropping of an OADM optical wavelength (or waveband), an input port of an OADM module may couple a part of optical power by using a 1:10 broadband optical coupler, and input coupled power to a photodetector (PD), and the PD is configured to detect optical power input by the OADM module. In addition, the PD may further be configured to receive a control command sent from a landing station. The control circuit part is described in a subsequent embodiment in more detail.

Based on FIG. 14, refer to FIG. 9, FIG. 13, FIG. 7, and the descriptions thereof, where FIG. 7 is a left half part of FIG. 14, and a right half part of FIG. 14 is an optical path that is mirror symmetric to the left half part; details are not described in this embodiment of the present invention.

Figure 15:
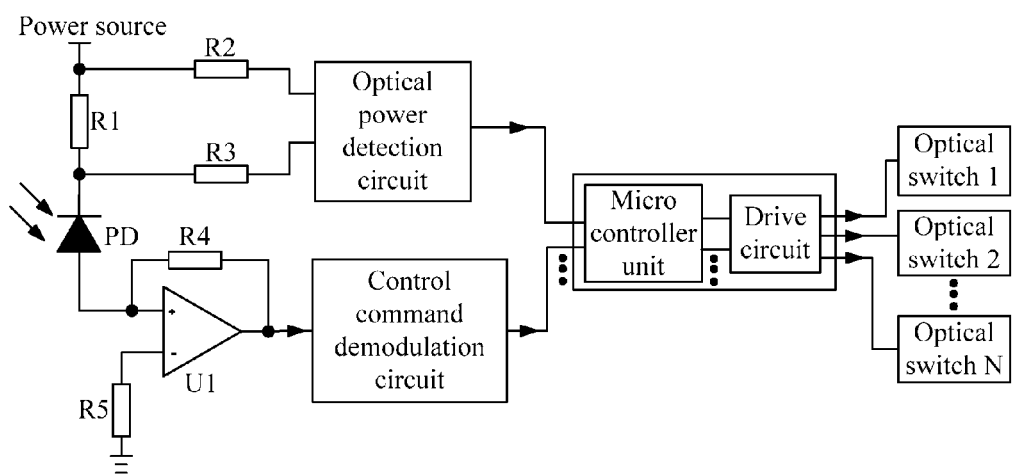
FIG. 15 is a schematic structural diagram of a control circuit according to an embodiment of the present invention.

The control circuit in this embodiment of the present invention is described as follows: as shown in FIG. 15, the control circuit in this embodiment of the present invention may include three parts: an input optical power abnormality detection circuit (an upper left part), a control command demodulation circuit (a lower left part), and a micro controller unit (MCU) and an optical switch drive circuit, where optical switches 1 to N are optical switches inside an OADM, and refer to FIG. 14. In FIG. 15, R1, R2, R3, and an input optical power detection circuit form the input optical power abnormality detection circuit, and refer to FIG. 5 and the descriptions thereof. In the circuit, R1 is a sampling resistor. Higher input optical power received by the photodetector (PD) leads to a greater optical current generated on R1 and greater corresponding voltage drop. On the contrary, when the photodetector has no input optical power, a dark current of the PD is very small, and therefore, voltage drop on R1 is small. On this basis, an amplifying circuit and a comparator circuit included in the optical power detection circuit can obtain a level trigger signal, which is defined as that a low level is output when input average optical power is normal, and that a high level is output when input optical power is abnormal. The trigger interruption signal is sent to the MCU, and the MCU sends a drive signal to an optical switch by using the drive circuit, so as to drive the corresponding optical switch to change a working state. For the other part, R4, R5, and U1 form a transimpedance amplifier, where further refer to FIG. 6 and the descriptions thereof. In FIG. 15, after converting an optical signal into an electrical signal, the PD demodulates, by using the subsequent control command demodulation circuit, a control command modulated on the optical signal, and sends the control command to the MCU. The MCU sends a drive signal to the optical switch by using the drive circuit, so as to drive the corresponding optical switch to change a working state.

When a submarine cable system works normally, an automatic redundancy mode is configured by default, a trunk carries service transmission by using a pass-through wavelength (waveband) of an OADM BU, and the trunk and a branch carry service transmission by using an add/drop wavelength (waveband) of the OADM BU. In this way, a service transmitted on the trunk does not need to be wrap connected through the branch, and confidential service transmission can be implemented maximally. In the following embodiment, switching of the optical switch in various working modes is described in more detail.

I. System Automatic Redundancy when a Shunt Fault Occurs in a Trunk

Figure 16A:
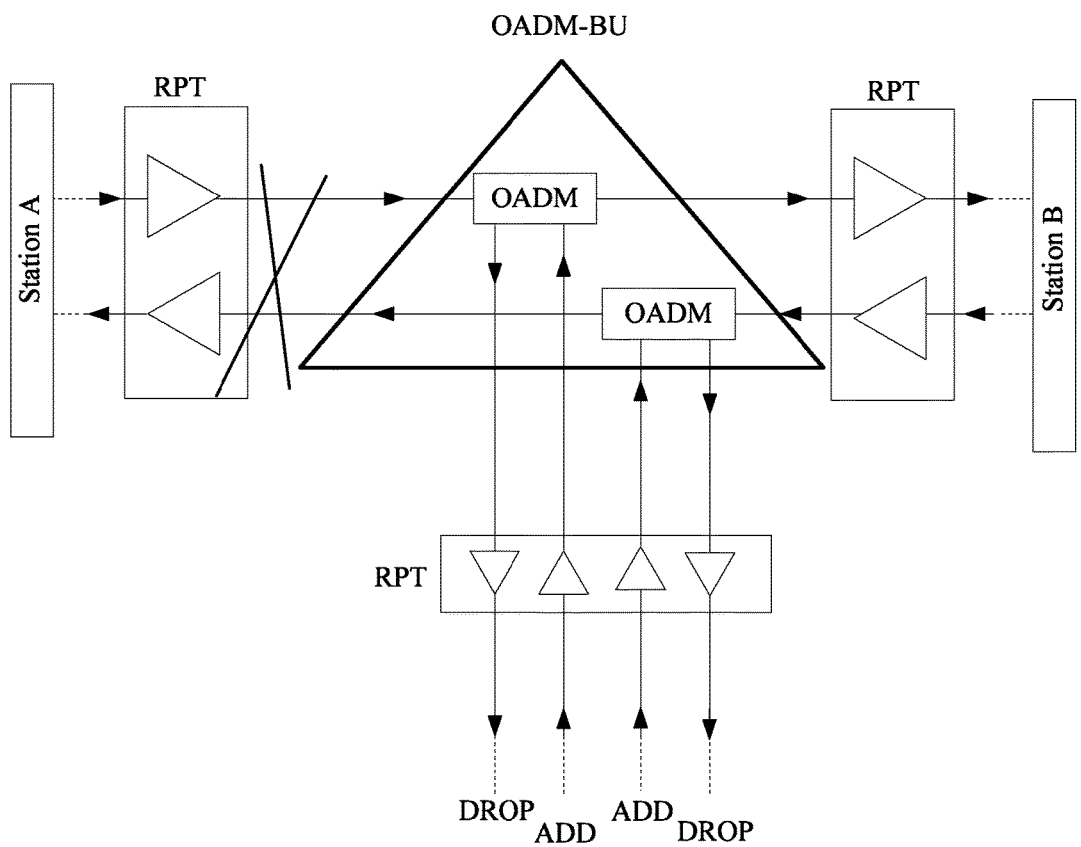
FIG. 16A is a schematic structural diagram of a submarine cable optical transmission system model according to an embodiment of the present invention.
Figure 16B:
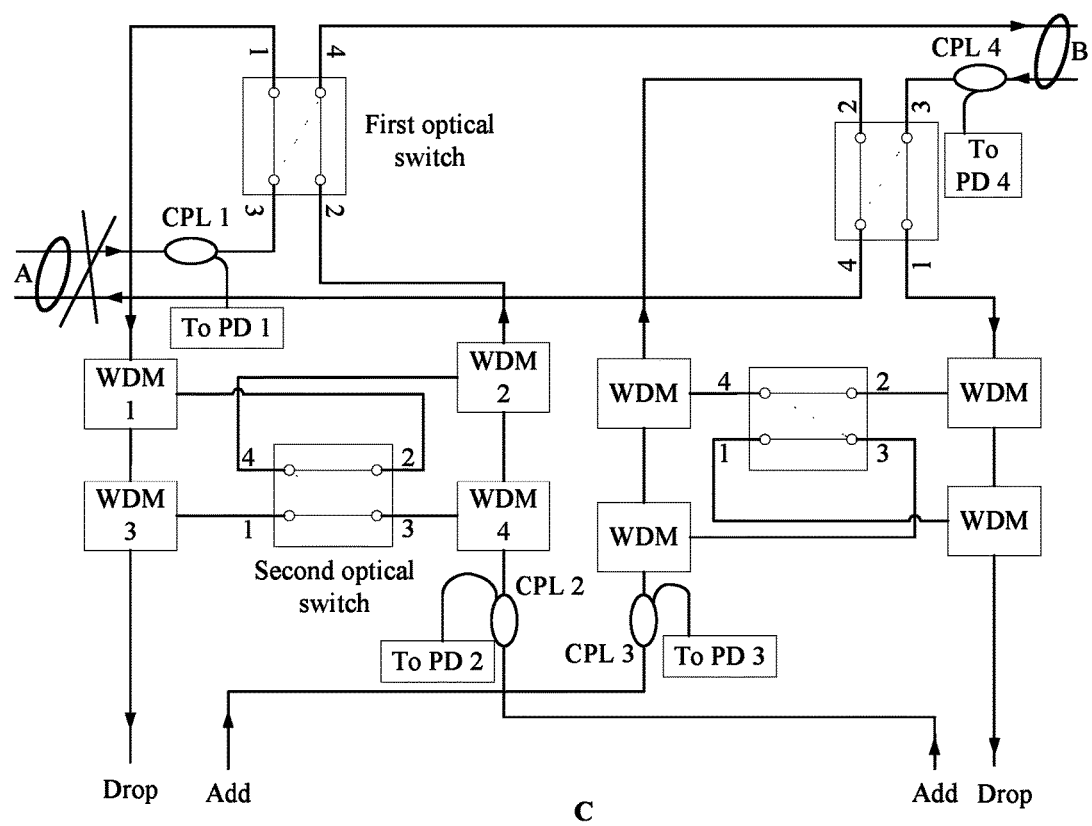
FIG. 16B is a schematic diagram of an internal structure of an OADM according to an embodiment of the present invention.

As shown in FIG. 16A and FIG. 16B, where FIG. 16B shows an internal structure of an OADM in FIG. 16A, and further refer to FIG. 13 and FIG. 15, when a submarine cable system suffers a shunt fault (including cable cut or fiber cut), in a position shown by crosses in FIG. 16A and FIG. 16B) on a left side adjacent to an OADM BU (that is, between the OANM BU and a PRT on a left side of the OADM BU), input light on a fault side is lost, and an input optical power detection circuit inside the OADM BU detects that optical power at an input port is lower than a preset threshold; then a trigger interruption signal is generated and sent to an MCU. After receiving the interruption signal, the MCU outputs a control signal to drive a corresponding optical switch to work, to change a transmission path of an optical path, thereby implementing an automatic redundancy function of the OADM BU. FIG. 16A shows an embodiment of system automatic redundancy when the trunk is faulty, and a working state of an optical switch on a lower left side (a second optical switch) in FIG. 16B is changed (from a first state to a second state). Refer to FIG. 7 and the descriptions thereof for optical path transmission before and after the change of the state of the second optical switch. Refer to FIG. 11 for an optical path before the state is changed, refer to FIG. 12 for an optical path after the state is changed, and refer to FIG. 7 and the descriptions thereof for a switch state and a flow direction of an optical signal.

Similarly, when a shunt fault occurs on a right side adjacent to the OADM BU, a working state of an optical switch on a lower right side of FIG. 16 is changed, so to implement an automatic redundancy function, which is mirror symmetric to that existing when the shunt fault occurred on the left side adjacent to the OADM BU, and details are not described herein again.

II. Automatic Redundancy when a Shunt Fault Occurs in a Branch

Figure 17A:
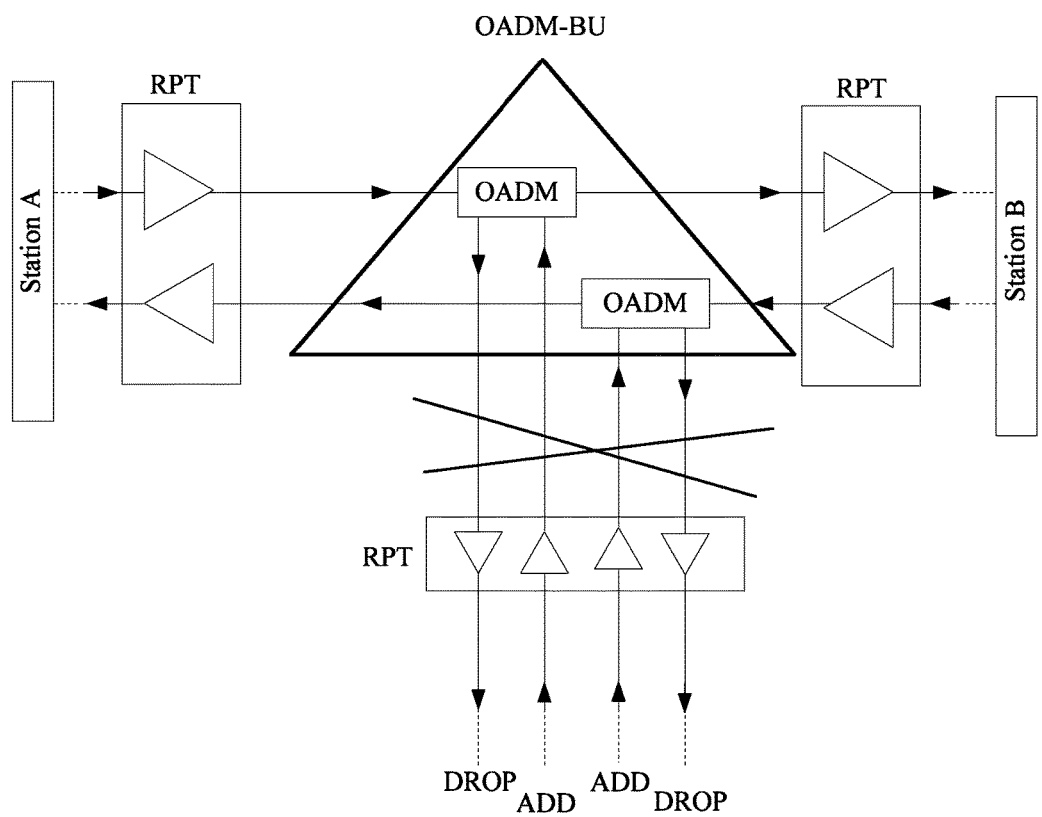
FIG. 17A is a schematic structural diagram of a submarine cable optical transmission system model according to an embodiment of the present invention.
Figure 17B:
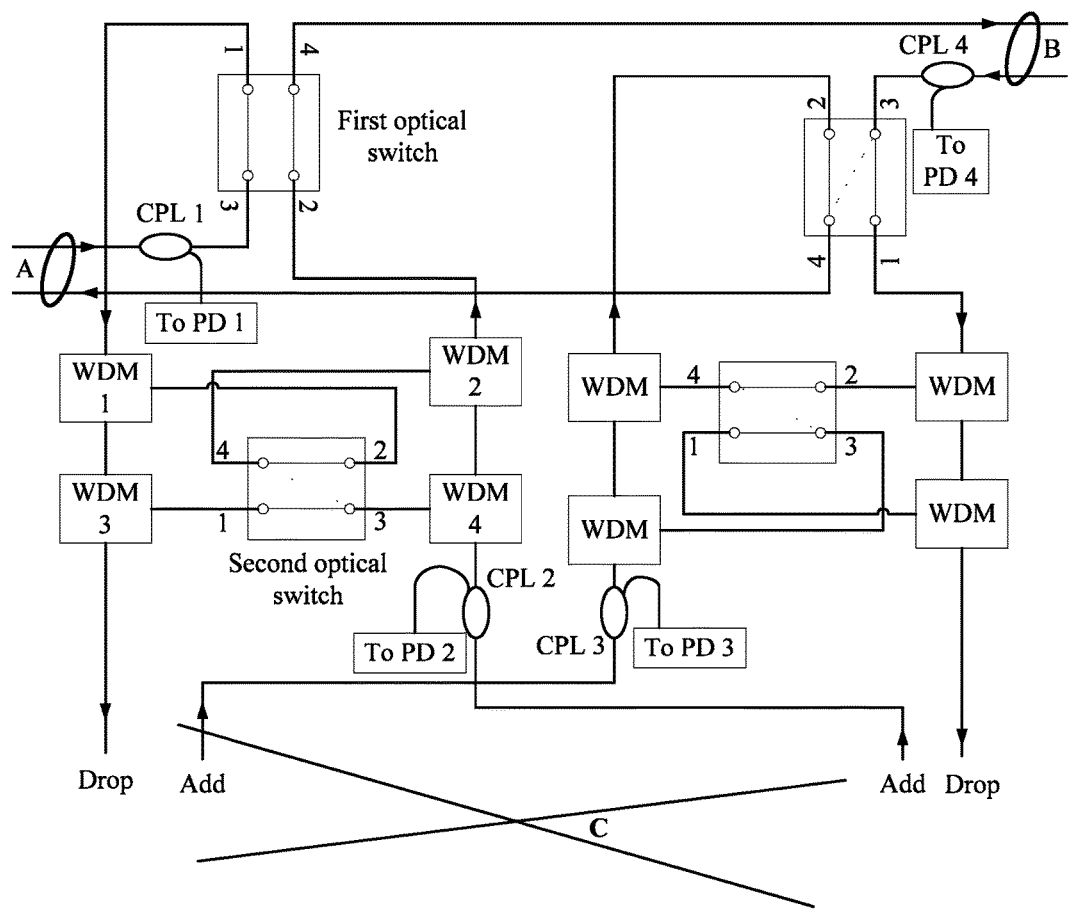
FIG. 17B is a schematic diagram of an internal structure of an OADM according to an embodiment of the present invention.

As shown in FIG. 17A and FIG. 17B, where FIG. 17B is an internal structure of an OADM in FIG. 17A, and further refer to FIG. 13 and FIG. 15, an embodiment of system automatic redundancy when a shunt fault occurs in a branch is shown.

When a circuit inside an OADM BU detects that input optical power on an add optical path of a branch is lost, a trigger interruption signal is sent, and an MCU changes working states of two optical switches in an upper part of FIG. 17B by using a drive circuit. After the working state is changed, refer to FIG. 12 for an optical path, and refer to FIG. 7 and the descriptions thereof for a switch state and a flow direction of an optical signal. In this case, a drop optical signal and a pass-through optical signal are transmitted in a trunk together, to complement the lost optical power of the add optical signal, thereby implementing an automatic redundancy function.

In addition, it should be noted that, when a fault occurs in the branch and automatic redundancy is implemented, an original drop service of an SLTE device of a trunk end station is sent to a trunk end station B. In this case, leakage between service transmission from the original trunk to the branch can be avoided in a corresponding wavelength channel of an SLTE terminal by means of scrambling.

Figure 18A:
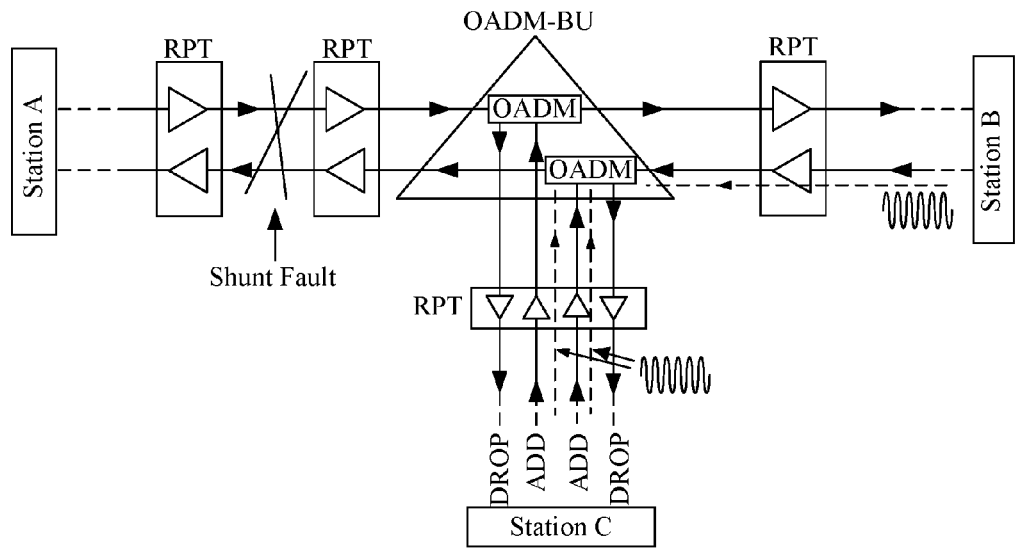
FIG. 18A is a schematic structural diagram of a submarine cable optical transmission system involving manual redundancy during trunk cable cut fault rectification according to an embodiment of the present invention.
Figure 18B:
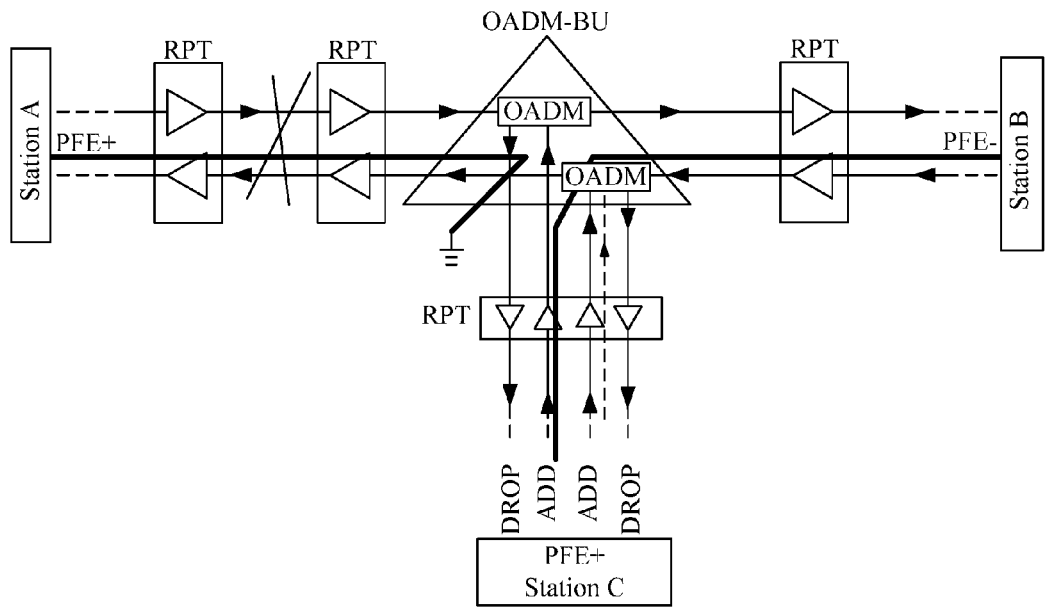
FIG. 18B is a schematic structural diagram of an electrical connection configuration in a fault rectification period for a faulty submarine cable according to an embodiment of the present invention.

III. Manual Redundancy Implemented by Delivering a Control Command from an End Station As shown in FIG. 18A and FIG. 18B, when a system suffers a cable cut fault (including cable cut or fiber cut) in a section that is non-adjacent to an OADM BU (a position shown by a cross in FIG. 18A), a power source parameter of power supply PFE at a trunk end station is adjusted, and power can still be normally supplied to an underwater product of a submarine cable system. In this case, an RPT outputs spontaneous emission ASE noise light, to complement a part of lost optical power, which results in that an input optical power detection circuit of the OADM BU detects that input optical power at an input port is higher than a preset threshold. In this case, the OADM BU does not proactively perform an operation of changing an optical path configuration.

In this case, if normal transmission can be sustained by combining an add service and the ASE noise, it is unnecessary to perform redundancy processing. In this way, service transmission interruption can be prevented from being interrupted by a man-made cause.

If normal transmission cannot be sustained when the add service and the ASE noise are combined, that is, service transmission between non-fault side stations degrades and is even interrupted (an end station sends an alarm), maintenance personnel may switch the system from automatic redundancy to a manual redundancy mode, which is specifically as follows: an end station is selected and a control command is delivered to the OADM BU by using the end station; after receiving the control command from the end station, the OADM BU restores the control command by means of photovoltaic conversion, a demodulation circuit, and the like, and inputs the restored control command to an MCU; and the MCU converts the control command into a drive signal for controlling an optical switch, to drive a corresponding optical switch to switch a state, thereby implementing manual redundancy.

In another aspect, when a fault occurs in the submarine cable system and a submarine cable on a fault side needs to be rectified, the maintenance personnel may first deliver a control command to the OADM BU from the end station, to switch the fault side to be grounded, so as to ensure safe fault rectification. FIG. 18B shows an electrical connection configuration in a fault rectification period of a faulty submarine cable, that is, an electrical connection configuration (shown by bold lines) of a system existing after the OADM BU performs power switching. Because in the fault rectification period of the faulty submarine cable, an RPT is powered off and does not send ASE noise light any longer, the OADM BU detects that input optical power is abnormal, and in an automatic redundancy mode, the OADM is switched to a second working mode to implement branch redundancy. In another aspect, a control command may also be manually delivered from an end station to configure an optical path of the OADM BU, so as to implement redundancy. FIG. 18A shows a manual redundancy situation during trunk cable cut fault rectification. Arrow directions of dotted lines (shown by directions of spiral threads) in FIG. 18A show three possible command transmission paths, and one of the paths may be selected to sent the control command. When reference is made to FIG. 18A and FIG. 18B, further refer to FIG. 16A and the descriptions thereof.

Figure 19:
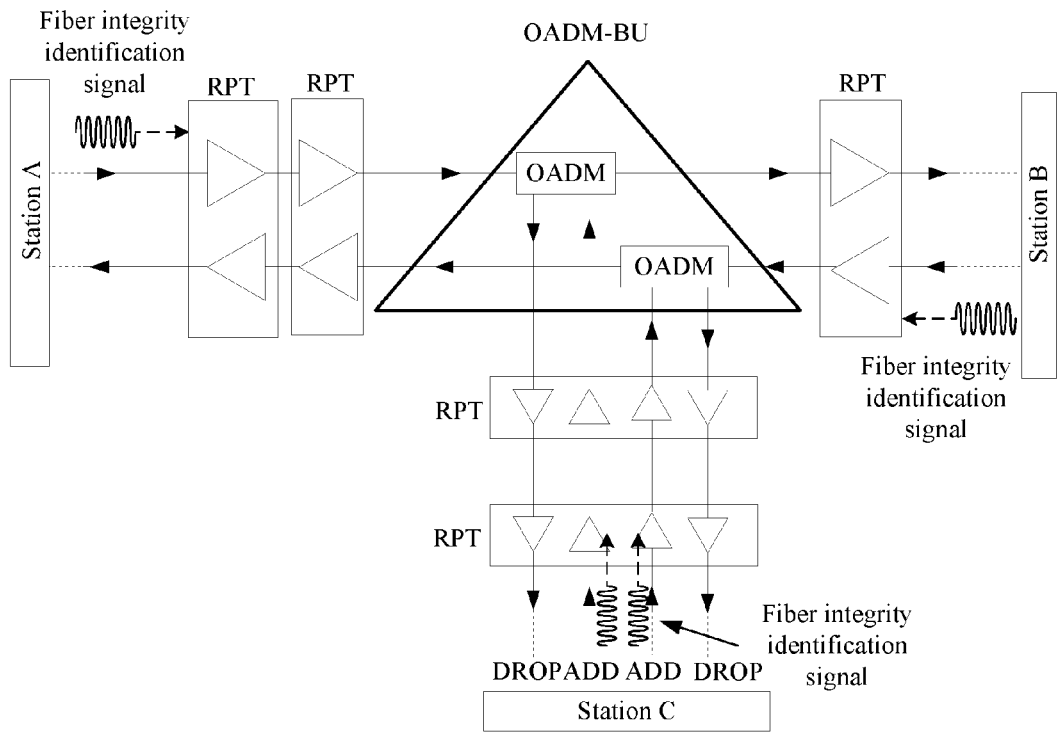
FIG. 19 is a schematic structural diagram of delivering a control command in manual redundancy for faulty submarine cable according to an embodiment of the present invention.

In all of the foregoing examples of the embodiments, whether shunt occurs is determined by detecting input optical power. Actually, whether shunt occurs may be detected in many other manners. An embodiment of the present invention gives another implementation solution as follows, in which shunt detection is implemented by using a fiber integrity identification signal. The fiber integrity identification signal may be a service optical modulation signal, a specific optical wavelength indication signal, or another signal that can be identified by the OADM BU. The solution is specifically as follows:

Refer to positions indicated by a spiral thread shown in FIG. 19. An end station generates a fiber integrity identification signal, and synthesizes the signal to a fiber transmission signal. Then, when detecting the fiber integrity identification signal included in an input optical signal, an OADM BU can determine that a submarine line is normal. When no fiber integrity signal in an input fiber is detected, it can be considered that a fault occurs on a corresponding optical path. After a fault is determined, an interruption trigger signal may be generated and sent to an MCU, and the MCU uses a drive circuit to drive a corresponding optical switch to switch a state, so as to implement automatic redundancy of the OADM BU. Refer to the structure in FIG. 16A for descriptions of a structure shown in FIG. 19.

Figure 20:
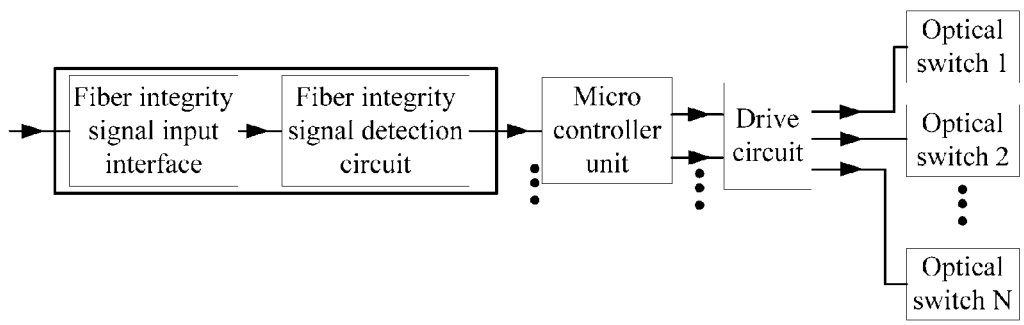
FIG. 20 is a schematic structural diagram of a fiber integrity signal detection circuit according to an embodiment of the present invention.

A fiber integrity signal detection circuit is shown in FIG. 20. A large solid line frame part on the left includes: a fiber integrity signal input interface and the fiber integrity signal detection circuit. An optical signal enters from the fiber integrity signal input interface. The fiber integrity signal detection circuit detects the signal, to determine whether a fiber integrity identification signal is included, and sends a result to a micro controller unit. The micro controller unit receives the result and learns whether there is a fault and a fault position, and then uses a drive circuit to drive a corresponding optical switch to change a state. Refer to FIG. 15 and the descriptions thereof for specific control of the micro controller unit.

Figure 21:
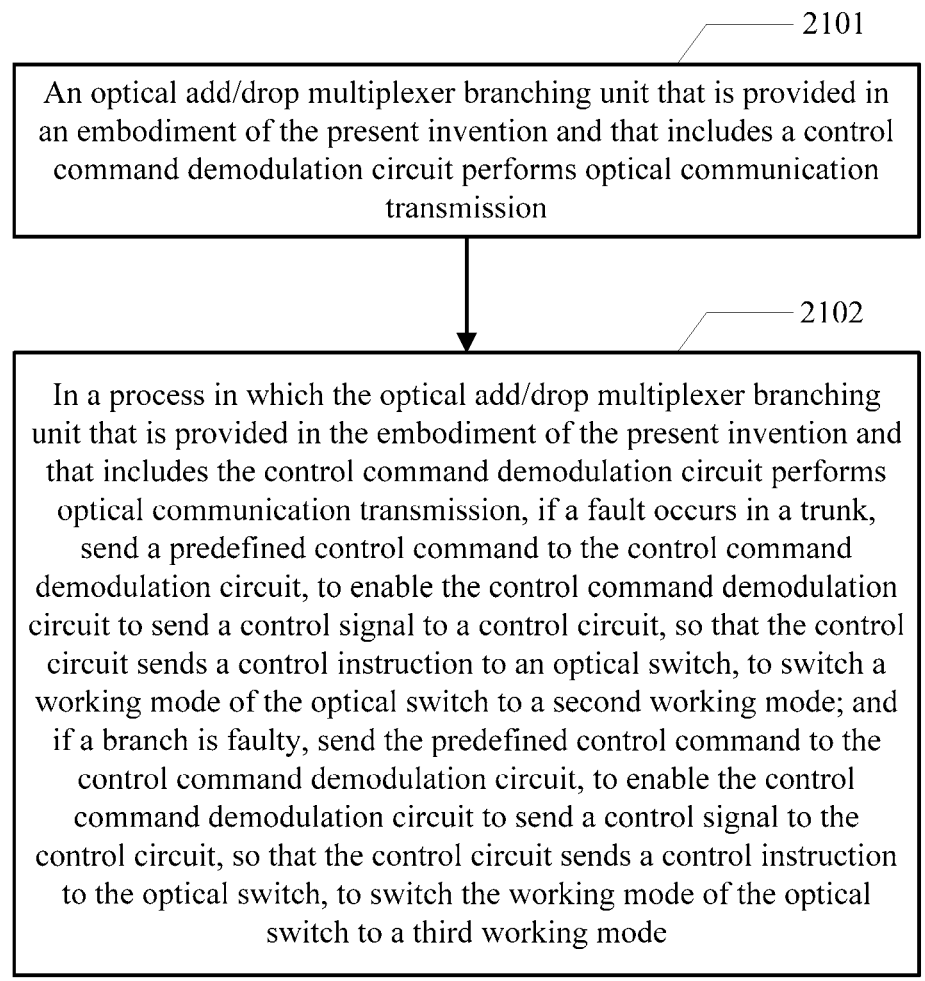
FIG. 21 is a schematic flowchart of a method according to an embodiment of the present invention.

An embodiment of the present invention further provides a method for using an optical add/drop multiplexer branching unit. As shown in FIG. 21, the method includes:

2101. An optical add/drop multiplexer branching unit that is provided in FIG. 3, FIG. 6, or FIG. 9 of the embodiment of the present invention and that includes a control command demodulation circuit, performs optical communication transmission.

2102. In a process in which the optical add/drop multiplexer branching unit that is provided in the embodiment of the present invention and that includes the control command demodulation circuit performs optical communication transmission, if a fault occurs in a trunk, send a predefined control command to the control command demodulation circuit, to enable the control command demodulation circuit to send a control signal to a control circuit, so that the control circuit sends a control instruction to an optical switch, to switch the working mode of the optical switch to a second working mode; and if a branch is faulty, send the predefined control command to the control command demodulation circuit, to enable the control command demodulation circuit to send a control signal to the control circuit, so that the control circuit sends a control instruction to the optical switch, to switch the working mode of the optical switch to a third working mode.

The foregoing fault is a fault that is already generated and that needs to be rectified. Therefore, the foregoing fault includes: a receive end cannot receive an optical signal and generates an alarm; or, power switching needs to be performed to perform fault rectification.

This embodiment of the present invention provides an implementation solution combining automatic redundancy, manual redundancy, and fault recovery, and a working principle is described as follows:

When a submarine cable system integrating an OADM BU works normally, the system is set to an automatic redundancy mode by default. During a fault rectification period of the system or when an automatic redundancy effect is poor, maintenance personnel sets the system to a manual redundancy mode by means of network management, which is specifically: delivering a control command from an end station to optimize an OADM optical path configuration, so as to finally achieve an objective of optimizing a redundancy effect.

When a shunt fault occurs in the submarine cable system, an input optical power detection circuit inside the OADM BU detects that optical power at an input port of an OADM module is lower than a preset threshold, and generates an input optical power abnormality alarm in real time, where the alarm signal is sent to an MCU as a trigger interruption signal. After receiving the interruption trigger signal, the MCU immediately generates a drive signal, to control a corresponding optical switch integrated inside the OADM to switch a state. When a fault occurs in a trunk, an Add-Output connection is configured inside the OADM BU, to implement automatic redundancy on a branch (corresponding to an optical path in FIG. 11). When a fault occurs in the branch, an Input-Output connection is configured inside the OADM BU, to implement automatic redundancy on the trunk (corresponding to an optical path in FIG. 12).

When a shunt fault occurs in the submarine cable system, if the input optical power detection circuit inside the OADM BU does not detect that input optical power is abnormal, the OADM BU does not proactively perform automatic redundancy. Usually, in this scenario, the shunt fault occurs between trunk repeaters (RPT) of the submarine cable system, and a power supply source of end station power feeding equipment (PFE) can still supply power to the RPT. As a result, ASE noise generated by the RPT is transmitted to the OADM BU along a submarine optical cable line. In the automatic redundancy mode, the ASE noise and an Add optical path add signal is synthesized into a lightwave signal, to be transmitted in the trunk. This scenario is similar to that in which a repeater is integrated inside the OADM BU. If normal transmission of an add service can be sustained, it is unnecessary to perform system redundancy, and real-time service transmission between end stations is not interrupted, thereby ensuring timeliness of OADM BU redundancy. If normal transmission of the add service cannot be sustained, an end station at a receive end sends an alarm. In this case, a manual redundancy mode needs to be started, so as to send a control command to the OADM BU by means of network management at the end station, and artificially configure an Add-Output connection for an OADM BU optical path, thereby implementing manual redundancy. In another aspect, when the submarine cable system suffers a fault and needs to be rectified, a branching unit with a power switching function (power switching branching unit, PSBU) first switches a faulty submarine cable end to be grounded. In this case, an RPT in a faulty submarine cable section is powered off and does not generate ASE noise any longer, a trunk input end of the OADM BU cannot receive an optical signal, an automatic redundancy mode is started, and a first working mode is entered. If normal transmission of the add service cannot be performed, the OADM BU optical path needs to be configured by using the manual redundancy mode, so as to ensure that normal transmission of the Add optical path service can be sustained in a fault rectification period.

Whether in the automatic redundancy mode or in the manual redundancy mode, after the system fault is rectified and normal power supply is recovered, the OADM BU detects that input optical power is normal, generates an interruption signal, and sends the interruption signal to the MCU; the MCU drives the optical switch integrated inside the OADM to switch a state, so as to automatically recover the system to a normal working state (corresponding to an optical path in FIG. 10).

Figure 22:
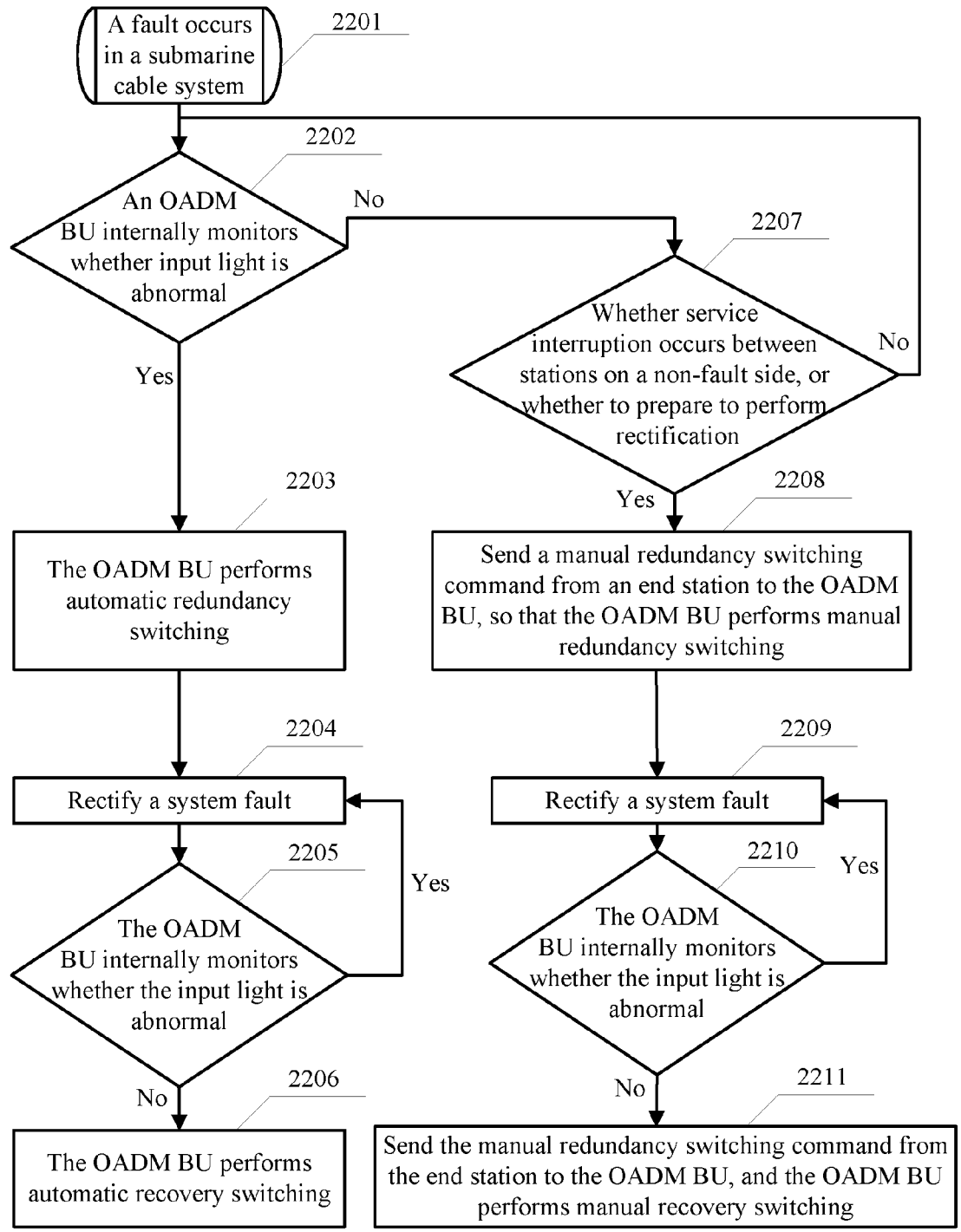
FIG. 22 is a schematic flowchart of a method according to an embodiment of the present invention.

The method process of the embodiment of the present invention is as a flowchart of an OADM BU redundancy solution shown in FIG. 22, including the following steps:

2201. A fault occurs in a submarine cable system.

2202. An OADM BU internally monitors whether input light is abnormal; if yes, go to 2203, and if no, go to 2207.

Refer to the descriptions on the detection circuit in the foregoing embodiment for a specific detection solution in this step.

2203. The OADM BU performs automatic redundancy switching.

Refer to the descriptions on the control circuit and state switching of the optical switch inside the OADM BU in the foregoing embodiment for a solution of automatic redundancy switching.

2204. Rectify a system fault.

2205. The OADM BU internally monitors whether the input light is abnormal; if yes, go to 2204, and otherwise, go to 2206.

2206. The OADM BU performs automatic recovery switching.

2207. Determine whether service interruption occurs between stations on a non-fault side, or whether to prepare to perform rectification; if yes, go to 2208, and otherwise, go to 2202.

2208. Send a manual redundancy switching command from an end station to the OADM BU, so that the OADM BU performs manual redundancy switching.

Refer to the descriptions on specific implementation of manual redundancy in the foregoing embodiment for implementation of manual redundancy switching in this step.

2209. Rectify a system fault.

2210. The OADM BU internally monitors whether the input light is abnormal; if yes, go to 2209, and otherwise, go to 2211.

Refer to the descriptions on the detection circuit in the foregoing embodiment for a specific detection solution in this step.

2211. Send the manual redundancy switching command from the end station to the OADM BU, and the OADM BU performs manual recovery switching.

A person of ordinary skill in the art may understand that all or some of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. An optical add/drop multiplexer branching apparatus, comprising:
a trunk input end, a branch input end, a trunk output end, a branch output end, an optical add/drop multiplexer, a first coupler, a first detection circuit, and a control circuit, wherein
the optical add/drop multiplexer comprises an optical switch;
the trunk input end is connected to an input end of the first coupler, two output ends of the first coupler are respectively connected to a first input end of the optical switch and an input end of the first detection circuit, the trunk output end is connected to a first output end of the optical switch, an output end of the first detection circuit is connected to an input end of the control circuit, an output end of the control circuit is connected to a third input end of the optical switch, the branch output end is connected to a second output end of the optical switch, and the branch input end is connected to a second input end of the optical switch;
the first detection circuit determines, according to an input optical signal, whether a trunk on a trunk input end side is faulty, and sends a detection result to the control circuit; when the trunk is normal, the optical switch is in a first working mode, and when the trunk is faulty, the control circuit sends a control instruction to the optical switch, to switch a working mode of the optical switch to a second working mode;
a trunk optical signal comprising a pass-through service optical signal and a drop service optical signal enters the optical add/drop multiplexer branching apparatus from the trunk input end, and then enters the first coupler through the input end of the first coupler; and the first coupler couples a part of the optical signal, sends the coupled part of the optical signal to the first detection circuit, and sends another part of the optical signal to the first input end of the optical switch;
an add optical path optical signal comprising an add service optical signal and a dummy optical signal enters the optical add/drop multiplexer branching apparatus from the branch input end, and then enters the second input end of the optical switch, wherein power of the add service optical signal is the same as power of the drop service optical signal, and power of the dummy optical signal is the same as power of the pass-through service optical signal; and
when the optical switch is in the first working mode, the pass-through service optical signal that enters from the first input end of the optical switch is sent to the first output end of the optical switch, the drop service optical signal is sent to the second output end of the optical switch, the add service optical signal that enters from the second input end of the optical switch is sent to the first output end of the optical switch, and the dummy optical signal is sent to the second output end of the optical switch; and when the optical switch is in the second working mode, the add service optical signal and the dummy optical signal that enter from the second input end of the optical switch are sent to the first output end of the optical switch, to interrupt the trunk optical signal that enters from the first input end of the optical switch.

2. The optical add/drop multiplexer branching apparatus according to claim 1, further comprising: a second coupler and a second detection circuit, wherein an input end of the second coupler is connected to the branch input end, and two output ends of the second coupler are respectively connected to the second detection circuit and the second input end of the optical switch;

the add optical path optical signal enters the optical add/drop multiplexer branching apparatus from the branch input end, and then enters the second coupler through the input end of the second coupler; and the second coupler couples a part of the optical signal, sends a coupled optical signal to the second detection circuit, and sends another part of the optical signal to the second input end of the optical switch;

the second detection circuit determines, according to the input optical signal, whether a branch on a branch input end side is faulty, and sends a detection result to the control circuit; and when the branch is faulty, the control circuit sends a control instruction to the optical switch, to switch the working mode of the optical switch to a third working mode; and when the optical switch is in the third working mode, the pass-through service optical signal and the drop service optical signal that enter from the first input end of the optical switch are sent to the first output end of the optical switch, to interrupt the add optical path optical signal that enters from the second input end of the optical switch.

3. The optical add/drop multiplexer branching apparatus according to claim 1, wherein:

in a working process of the optical switch that is in the second working mode, when the first detection circuit determines that a fault in the trunk on the trunk input end side is rectified, a control instruction is sent to the optical switch, to switch the working mode of the optical switch to the first working mode; and in a working process of the optical switch that is in the third working mode, when the second detection circuit determines that a fault in the branch is rectified, a control instruction is sent to the optical switch, to switch the working mode of the optical switch to the first working mode.

4. The optical add/drop multiplexer branching apparatus according to claim 1, wherein the first detection circuit comprises a fiber integrity signal detection circuit; the trunk optical signal comprises a fiber integrity identification signal; and that the first detection circuit determines, according to an input optical signal, whether a trunk on a trunk input end side is faulty comprises:

the fiber integrity signal detection circuit detects a fiber integrity identification signal in the input optical signal; when there is a fiber integrity identification signal, determines that the trunk on the trunk input end side is normal; and otherwise, determines that the trunk on the trunk input end side is faulty.

5. The optical add/drop multiplexer branching apparatus according to claim 1, wherein the first detection circuit comprises:

a first photodetector, a transimpedance amplifier, a first resistor, a second resistor, a third resistor, and an optical power detection circuit, wherein an output end of the first photodetector is connected to a first end of the first resistor and a first end of the third resistor, the output end of the first photodetector is connected to an input end of an operational amplifier, and another input end of the transimpedance amplifier is grounded;

a second end of the first resistor and a first end of the second resistor are connected to a power interface, a second end of the second resistor and a second end of the third resistor are connected to an input end of the optical power detection circuit, and an output end of the optical power detection circuit is connected to the control circuit; and that the first detection circuit determines, according to an input optical signal, whether a trunk on a trunk input end side is faulty, and sends a detection result to the control circuit; and when the trunk is faulty, the control circuit sends a control instruction to the optical switch, to switch the working mode of the optical switch to a second working mode comprises:

an optical splitting signal coupled by the first coupler is sent to the first photodetector, so that the first photodetector generates a current; and the optical power detection circuit triggers a level signal to the control circuit when detecting that the current is abnormal, so that the control circuit sends the control instruction to the optical switch, to switch the working mode of the optical switch to the second working mode.

6. The optical add/drop multiplexer branching apparatus according to claim 1, wherein the optical add/drop multiplexer comprises: a first optical switch, a second optical switch, a first filter, a second filter, a third filter, and a fourth filter, wherein the first optical switch and the second optical switch each have four interfaces;

a third interface of the first optical switch is connected to an output end of the first coupler, an input end of the fourth filter is the branch input end, an output end of the third filter is the branch output end, and a fourth interface of the first optical switch is the trunk output end;

a first interface of the first optical switch is connected to an input port of the first filter, the first filter has one input port and two output ports, the two output ports of the first filter are respectively connected to an input port of the third filter and a second interface of the second optical switch, the fourth interface of the first optical switch is connected to the trunk output end, and a second interface of the first optical switch is connected to an output end of the second filter;

the fourth filter comprises one input port and two output ports, and the two output ports of the fourth filter are respectively connected to a third interface of the second optical switch and an input port of the second filter;

a first interface of the second optical switch is connected to the input port of the third filter, and a fourth interface of the second filter is connected to the input port of the second filter;

that when the optical switch is in the first working mode, the pass-through service optical signal that enters from the first input end of the optical switch is sent to the first output end of the optical switch, the drop service optical signal is sent to the second output end of the optical switch, the add service optical signal that enters from the second input end of the optical switch is sent to the first output end of the optical switch, and the dummy optical signal is sent to the second output end of the optical switch comprises:

in the first working mode, the first interface and the third interface of the first optical switch are connected, and the second interface and the fourth interface of the first optical switch are connected; a first interface and the third interface of the second optical switch are connected, and the second interface and the fourth interface of the second optical switch are connected; the trunk optical signal enters the first optical switch from the third interface of the first optical switch, and enters the first filter through the first interface of the first optical switch; and the first filter splits the trunk optical signal into the pass-through service optical signal and the drop service optical signal, sends the pass-through service optical signal to the second interface of the second optical switch, and sends the drop service optical signal to the third filter;

the add optical path optical signal enters the fourth filter from an input port of the fourth filter, and the fourth filter splits the add optical path optical signal into the add service optical signal and the dummy optical signal, sends the add service optical signal to the input port of the second filter, and sends the dummy optical signal to the third interface of the second optical switch;

the dummy optical signal that enters from the third interface of the second optical switch is sent to the input port of the third filter through the first interface of the second optical switch, and the third filter combines the input drop service optical signal and dummy optical signal and outputs a first combined signal from an output port of the third filter; and the pass-through service optical signal that enters from the second interface of the second optical switch is sent to the input port of the second filter through the fourth interface of the second optical switch; the second filter combines the input pass-through service optical signal and add service optical signal and sends a second combined signal to the second interface of the first optical switch; and the second combined signal is output through the fourth interface of the first optical switch; and that when the optical switch is in the second working mode, the add service optical signal and the dummy optical signal that enter from the second input end are sent to the first output end, to interrupt the trunk optical signal that enters from the first input end comprises:

in the second working mode, the first interface and the third interface of the first optical switch are connected, and the second interface and the fourth interface of the first optical switch are connected; and the third interface and the fourth interface of the second optical switch are connected;

the add optical path optical signal enters the fourth filter from an input port of the fourth filter, and the fourth filter splits the add optical path optical signal into the add service optical signal and the dummy optical signal, sends the add service optical signal to the input port of the second filter, and sends the dummy optical signal to the third interface of the second optical switch; and the dummy optical signal that enters from the third interface of the second optical switch is sent to the input port of the second filter through the fourth interface of the second optical switch, and the second filter combines the input add service optical signal and dummy optical signal and outputs a third combined signal from the output port of the third filter.

7. The optical add/drop multiplexer branching apparatus according to claim 2, further comprising:

a control command demodulation circuit, wherein an output end of the control command demodulation circuit is connected to the input end of the control circuit; and an input end of the control command demodulation circuit receives a control command and then demodulates the control command, and sends a control signal to the control circuit, so that the control circuit sends a control instruction to the optical switch, to switch the working mode of the optical switch to one of: the second working mode and the third working mode.

8. The optical add/drop multiplexer branching apparatus according to claim 5, further comprising: a second coupler, a second detection circuit, and a control command demodulation circuit wherein an input end of the second coupler is connected to the branch input end, and two output ends of the second coupler are respectively connected to the second detection circuit and the second input end of the optical switch;

the add optical path optical signal enters the optical add/drop multiplexer branching apparatus from the branch input end, and then enters the second coupler through the input end of the second coupler; and the second coupler couples a part of the optical signal, sends a coupled optical signal to the second detection circuit, and sends another part of the optical signal to the second input end of the optical switch;

the second detection circuit determines, according to the input optical signal, whether a branch on a branch input end side is faulty, and sends a detection result to the control circuit; and when the branch is faulty, the control circuit sends a control instruction to the optical switch, to switch the working mode of the optical switch to a third working mode;

when the optical switch is in the third working mode, the pass-through service optical signal and the drop service optical signal that enter from the first input end of the optical switch are sent to the first output end of the optical switch, to interrupt the add optical path optical signal that enters from the second input end of the optical switch;

an output end of the control command demodulation circuit is connected to the input end of the control circuit;

an input end of the control command demodulation circuit receives a control command and then demodulates the control command, and sends a control signal to the control circuit, so that the control circuit sends a control instruction to the optical switch, to switch the working mode of the optical switch to one of: the second working mode and the third working mode;

the input end of the control command demodulation circuit is connected to an output end of the transimpedance amplifier, and the output end of the transimpedance amplifier is connected to the control circuit; and that an input end of the control command demodulation circuit receives a control command and then demodulates the control command, and sends a control signal to the control circuit, so that the control circuit sends a control instruction to the optical switch, to switch the working mode of the optical switch to one of: the second working mode and the third working mode comprises:

the first photodetector generates the current by using optical power received by the first photodetector; the current passes through the transimpedance amplifier, and the transimpedance amplifier outputs an electrical signal to the control command demodulation circuit; after obtaining the control command by means of demodulation, the control command demodulation circuit sends the control command to the control circuit; and when the control command is a predefined control command, the control circuit sends the control instruction to the optical switch, to switch the working mode of the optical switch to one of: the second working mode and the third working mode.

9. The optical add/drop multiplexer branching apparatus according to claim 6, wherein
in the third working mode, the third interface and the fourth interface of the first optical switch are connected; and the first interface and the third interface of the second optical switch are connected, and the second interface and the fourth interface of the second optical switch are connected; and
the trunk optical signal enters the first optical switch from the third interface of the first optical switch, and is output through the fourth interface.

10. The optical add/drop multiplexer branching apparatus according to claim 7, wherein the control circuit comprises: a microcontroller and a drive circuit, wherein an input end of the microcontroller is connected to the first detection circuit, the second detection circuit, and the control command demodulation circuit, an output end of the microcontroller is connected to the drive circuit, and the drive circuit is connected to the optical switch; and when the detection result, sent by the first detection circuit, indicating that the trunk is faulty is received, a drive instruction is output, so that the drive circuit drives the optical switch to switch to the second working mode; when the detection result, sent by the second detection circuit, indicating that the branch is faulty is received, a drive instruction is output, so that the drive circuit drives the optical switch to switch to the third working mode; and when the control signal of the control command demodulation circuit is received, a drive instruction is output, so that the drive circuit drives the optical switch to switch to the second working mode.

* * * * *